(12) United States Patent
Chien et al.

(10) Patent No.: US 9,746,118 B2
(45) Date of Patent: Aug. 29, 2017

(54) METHOD AND STRUCTURE FOR PREVENTING SLIPPING-OFF OF A TUBE IN A PIPE JOINT MADE OF FLUORORESIN

(71) Applicant: Bueno Technology Co., Ltd., Tainan (TW)

(72) Inventors: Huan-Jan Chien, Hsinchu County (TW); Po-Wen Chen, Tainan (TW)

(73) Assignee: BUENO TECHNOLOGY CO., LTD., Tainan (TW)

( * ) Notice: Subject to any disclaimer, the term of this patent is extended or adjusted under 35 U.S.C. 154(b) by 158 days.

(21) Appl. No.: 14/261,695

(22) Filed: Apr. 25, 2014

(65) Prior Publication Data

US 2014/0319827 A1    Oct. 30, 2014

(30) Foreign Application Priority Data

Apr. 25, 2013    (TW) .............................. 102114766 A

(51) Int. Cl.
*F16L 25/00* (2006.01)
*F16L 47/04* (2006.01)
*F16L 19/05* (2006.01)

(52) U.S. Cl.
CPC .............. *F16L 47/04* (2013.01); *F16L 19/05* (2013.01); *F16L 2201/30* (2013.01); *F16L 2201/40* (2013.01)

(58) Field of Classification Search
USPC ......... 285/249, 234, 334.5, 382.7, 342, 343, 285/354
See application file for complete search history.

(56) References Cited

U.S. PATENT DOCUMENTS

| 3,977,708 A | 8/1976 | Jopp |
| 4,666,190 A * | 5/1987 | Yamabe ................ F16L 33/222 285/248 |
| 5,154,453 A | 10/1992 | Nishio |
| 5,472,244 A | 12/1995 | Nishikata et al. |
| 6,543,815 B2 | 4/2003 | Suzuki |
| 6,776,440 B2 | 8/2004 | Nishio |
| 2011/0210544 A1 | 9/2011 | Teshima et al. |

FOREIGN PATENT DOCUMENTS

| JP | 61-105391 A | 5/1986 |
| JP | 02-052723 A | 2/1990 |
| JP | 02-117494 U | 9/1990 |
| JP | 4208226 B | 10/2008 |
| TW | I335395 | 1/2011 |

* cited by examiner

*Primary Examiner* — Aaron Dunwoody
(74) *Attorney, Agent, or Firm* — Ming Chow; Sinorica, LLC

(57) ABSTRACT

A pipe joint structure has a joint body, a fixed ring and a union nut. A flared end of a tube has a conical surface and a tubular surface. The conical surface and tubular surface are connected to a tube connecting portion of the joint body. The union nut is fastened to a locking thread of the tube connecting portion. An interior recess portion of the union nut is coupled with a bulging surface of the fixed ring. The tube is compressed evenly and secured firmly on the joint body.

3 Claims, 18 Drawing Sheets

Figure 1A:
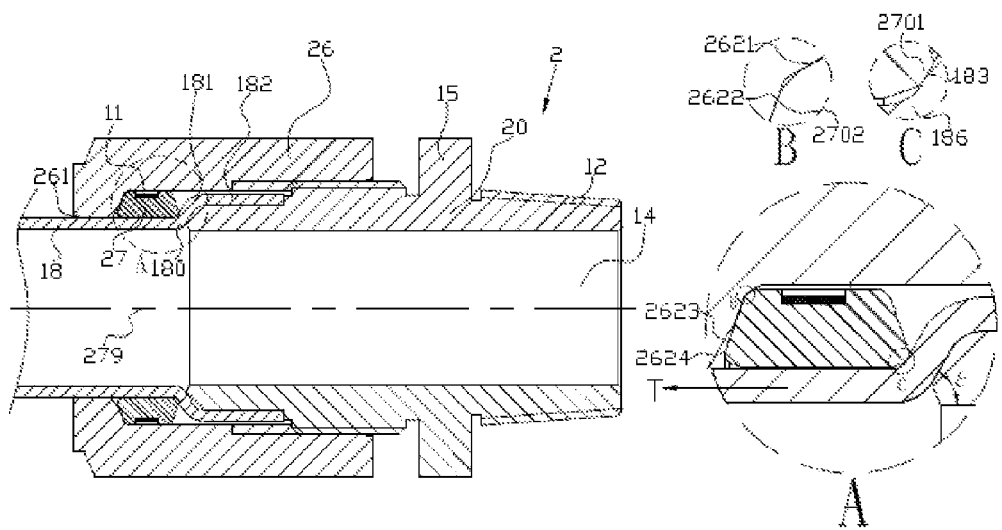

METHOD AND STRUCTURE FOR PREVENTING SLIPPING-OFF OF A TUBE IN A PIPE JOINT MADE OF FLUORORESIN

The current application claims a foreign priority to the patent application of Taiwan No. 102114766 filed on Apr. 25, 2013.

FIELD OF THE INVENTION

The present invention relates to using a kind of pipe joint made of fluororesin, such as PFA, ETFE, PTFE, PVDF, FEP and PCTFE, etc. to fulfill the delivery needs of a variety of highly corrosive fluids. This kind of pipe joint, in particularly made of PFA, PTFE and other fluororesin are able to meet the applying requirements to withstand a high temperature of over 150° C.

BACKGROUND OF THE INVENTION

Plastic and rubber tubes and pipe joints have been widely used to deliver fluids and achieve sealing, anti-slipping off and other purposes. However, these tubes can be easily expanded, stretched and deformed under high pressure to reduce their sealing effect, and while delivering high-temperature fluids, the strength of pipe joints may also be reduced so as to lower the sealing effect. Such aforesaid situations may generate minute leakage. Meanwhile, large leakage on pipe joints may be caused by water hammering effect or unexpected external stretch on piping during the delivery process. In addition, leakage can also occur due to excessive compression or pressing on the tube wall of pipe joints, resulting in tube wall material fatigue, reduced compression ability and breakage caused by damages. Therefore, industrial safety has stipulated the following basic requirements on tubes and pipe joints:
(1) Reasonable pressure and temperature resistance specifications to avoid possible pipe joint leakage in various applications.
(2) Possess tube pulling resistance ability: when the pipe joint of tube is subjected to pull and external stretch caused by internal pressure, it is able to withstand a certain degree of pulling force to avoid the tube from slipping off easily and leaking extensively.
(3) To avoid a complete slipping off: the pipe joint must possess a special mechanism or structure capable of preventing the tube from slipping off completely and avoiding extensive leakage.
(4) Early detection of leakage: in the event of a leakage, it can be detected earlier and the pipe joint be replaced whenever a minute leakage occurs.
(5) The materials of all pipe joint components must be able to withstand corrosion, operating pressure and operating temperature during delivery.
(6) No emissions of metal ions are allowed on the materials to avoid contamination to the delivery fluid.

A basic safety pipe joint must conform with the aforesaid (1) and (2) conditions; a high safety pipe joint must conform with the aforesaid (3) condition; and a pre-alert pipe joint must conform with the aforesaid (4) condition.

While specifically using tubes and pipe joints in delivering highly corrosive, highly toxic and highly purity fluids in semiconductor, pharmaceutical, electronic and other industries, further industry safety requirements are required on the aforesaid industries. For examples, the leakage risk requirement on fluids that would harm the human body or cause serious harms to the environment must be further reduced, or the sealing and anti-leakage reliability on pipe joints must be relatively enhanced. In addition, to cope with the manufacturing process of delivering highly purity fluids, the tubes and pipe joints must be stipulated with additional new requirements.

Currently, only fluororesin tubes and pipe joints are capable of meeting the requirements in the aforesaid industrial applications of delivering high corrosive and high purity fluids. While selecting the flouroresin material in delivering fluids, considerations are still needed on individual fluid corrosion ability. In many circumstances, full-PFA material is an option, but the physical properties of flouroresin will prevent the traditional pipe joints from meeting the above requirements due to their structures. In other words, the tubes and pipe joints must comply with the above six basic requirements while delivering high-purity, high-corrosive and other fluids of special properties. Furthermore, they must also meet the needs for being reusable, at least 20 assembly/disassembly cycles without the occurrence of leakage.

The followings are the basic physical properties of polytetrafluoroethene of fluororesin—polyfluoroalkoxy (PFA):
It features a long-chain molecular structure with a smooth surface, low dynamic friction coefficient of 0.2, a long-chain molecular structure capable of providing tube material with excellent flexibility and elongation of more than 300%, excellent tensile strength of 24.5~34.3 Mpa, and compression strength of 16.7 Mpa. However, it will deform when subjected to compression or reduce its strength when heated up to 0.45 Mpa@75° C. and 1.81 Mpa@50° C., respectively. The maximum applicable temperature is 260° C., and the thermal expansion coefficient is 12E-5/° C. PFA tubes are hard to process as they may generate a range of 5%~10% dimensional tolerance on outer diameter, wall thickness and the eccentricity of through hole.

In addition, when the tubes are used long-term under consistent external force, high pressure and other conditions, their wall materials will simultaneously subjected to etching corrosion, infiltration and degradation. Coupled with an increase in seal leakage on the original sealed surface, there is a possibility to cause rapid fluid leakage phenomenon on nearby walls that cannot be detected with the naked eye. Therefore, in the applications of high-corrosive and high-toxic fluids, an early detection of leakage is one of the essential functions of flouroresin pipe joints.

Based on these physical properties and application requirements, the following precautions are needed while designing pipe joints of PFA tubes:
(1) The smooth surface and low frictional coefficient of sliding of PFA is a characteristic to generate poor surface adhesion, and made it unsuitable to use on pressurized surface sealing. Its excellent compression strength represents that the compressed face is unlikely to generate damage or fatigue caused by compression strength. However, it is still not recommended to exert with excessive compression force F to cause wall material fatigue, resulting in inability to withstand the requirement of 20 assembly/disassembly cycles without leaking.
(2) High elongation represents that the wall material can be easily subjected to move and cause the wall thickness to thin down due to elongation in the event of pressure or stretch. This will cause a decrease in compression volume of tube wall following the movement of material, resulting in reduced or invalid sealing effect, as well as easy slipping off of tubes when subjected to external stretch.
(3) The material strength will decrease following an increase in temperature, i.e. a strength reduction for all pipe joint components that subjected to compression force and a possible leak caused by a drop in compression force on the compressed tube wall.

(4) While installing a pipe joint, a jig is often used to perform heated or unheated flaring operation. The wall thickness of cone tube and cylindrical tube will be enlarged with a higher thickness tolerance after the tube has bee flared. This will relatively lower the effectiveness in performing compressive sealing on tube wall thickness. In summary, the bigger the conical angle $\epsilon$, the greater is thickness tolerance, the more difficulty in shaping, and a higher on-site construction cost.

(5) Sealed surface: the cone tube's wall of tube's flared end is able to abut the tube connecting portion's conical surface of joint body to form a conical angle $\epsilon$. When the compression ring on fixed ring is pressing hard against the conical surface of cone tube, the compressed point on tube wall will form an annular sealed surface. The said sealed surface is circular or near circular shape when it is positioned at same concentricity height of fixed ring. When said position is lower than concentricity or is skewed, said sealed surface may appear to be oval or irregular annular shape. When the pipe joint is fastened, the compression ring on fixed ring will not be able to force the cone tube to abut the conical surface to form a sealed surface as it is non-annular. Thus, an annular sealed surface is essential to generate a highly sealed surface.

(6) High-temperature leakage test: the conventional method is to fasten the pipe joint and place it in a high-temperature furnace at a certain temperature such as 150° C. After heated and baked for several hours, it is allowed to cool down gradually and immersed in water, and then applied with a working pressure such as 7 kg/cm$^2$ at pipe joint interior with nitrogen gas ($N_2$) for a certain period of time. Finally, the exterior surface is observed whether or not the presence of bubbles.

(7) Compression force F: while fastening the union nut to joint body, it will exert a compression force F on the wall of cone tube. The compression force F direction is originated from union nut's compression ring or applied force ring edge to the sealed surface of conical face where the cone tube has been pressed, with the presence of a conical angle $\epsilon$. The included angle between the compression force F and the axial tube direction is known as the applied force angle $\gamma$. The included angle between the compression force F and conical surface's normal line is known as the applied force included angle $\theta$, wherein $\theta=90°-\epsilon-\gamma$. Relatively, the pressing force F on conical surface can be divided into vertical distribution force Fn that falls vertically on the conical surface, wherein $Fn=F\times COS(\theta)$; and horizontal distribution force Fh that runs horizontally with the conical surface, wherein $Fh=F\times SIN(\theta)$. The bigger the applied force included $\theta$, the greater will be the horizontal distribution force Fh to known as the basic compression force; and the smaller the applied force included angle $\theta$, the greater will be the vertical distribution force Fn to known as a high compression force.

(8) Pulling resistance ability: the tube's pulling strength T may arise from tube's internal pressure or from the outside. When the tube is subjected to a pulling force, the pulling resistance force T of pipe joint comes from: Firstly, when the compression force F is in pulling force T direction, it has a greater pulling resistance distribution force Ft and is positioned at opposite direction, wherein $Ft=F\times COS(\gamma)$. Secondly, the greater the vertical distribution force Fn of compression force F, the easier for it to prevent tube wall material moving when it is subjected to pulling force F. While conducting a tensile test on said tube, if its deformed length can be stretched more than twice its original length of plastic deformation, such pipe joint is regarded as to posses a high pulling resistance force ability.

(9) Structure of compression ring: the compression ring appears to have an angular structure, including triangular, trapezoidal, small rounded angle, right angle and obtuse, etc. Its geometric angle is known as compression angle $\beta$. If angle $\beta$ is too small, it may pierce through the tube wall material to cause damages. When the compression ring expands and deforms along the conical surface, it will push the tube wall material outward along the conical surface outside diameter to increase the thickness of outer perimeter of tube wall of sealed surface and deform. If the compression ring continues to be subjected to pulling force T and move inside the compression sealed surface's tube wall material of compression ring, there is a facial contact between the cone tube's inner wall surface and conical surface to generate a lower friction and enhance more material moving when subjected to pull. Meanwhile, the cone tube's outer wall that has been directly compressed by the compression ring will generate a higher friction to enhance continuous annular cumulative deformation of material when subjected to stretch. The greater the cumulative deformation, the better it is to improve the pulling resistance ability.

(10) Locking process: when the union nut's inner diameter thread is fastened firmly to the locking thread on joint body's connecting portion to become coupling locking, the phenomenon that starts from the sealed surface's tube wall that has been clamped, for instance, the direct manual fastening condition of pipe joint with hand is regarded as the starting point of fastening; while manual fastening or with the help of a tool until a preset position is regarded as the end of fastening. This is known as the fastening process. In this process, a greater torque is required to apply on the union nut in order to provide a fastening force, and generate a compression force on the sealed surface.

(11) Fastening circumferential angle: the compression force bore by tube wall is related to locking thread pitch. A turn of the union nut is equivalent to a 360° circumferential angle, representing that the entire sealed structure is withstanding an axial compression volume of one thread pitch. However, this axial compression volume will be distributed to relevant parts which also denotes the elastic deformation volume of relevant parts. The sealed surface's wall thickness will also increase part of the compression volume. Thus, a complete fastening process does not necessarily mean to actually fasten the union nut one turn.

(12) Axial compression: during the fastening process, the fixed ring, tube wall, the conical surface and tubular surface of tube connecting portion will all be subjected to compression force from union nut to generate compression deformation. This also includes the structural deformation of relevant parts and threads. Such compression deformation within the elastic range is the compression force that the sealed surface will receive. An even compression deformation can only be generated when the sealed surface is in annular or near annular shape, but these compression deformations will lost part of the elasticity due to prolonged creep, or a reduction in compression force. Among them, only when the conical surface and cylindrical surface have appropriate thicknesses can they maintain a better compression force. Besides reducing the strength while performing high-temperature leakage test or delivering high-temperature fluid, it will also accelerate the occurrence of creep. In other words, the fluorine plastic will reduce its elasticity to generate a localized permanent deformation due to high temperature. The relevant parts will also subject to similar frequency of axial compression in repeated assembly/disassembly cycles. This will also accelerate the creep phenomenon to lower the compression force and increase the risk of high sealing leakage. The union nut, including the thread will relatively subject to tension and reduce its compression force ability due to repeated stress or high temperature. To achieve the sealing effect through increasing the high axial compression volume exceeding the reasonable limits is not a solution, as an excessive compression volume will accelerate the sealed surface's wall fatigue and deformation and reduce its ability to withstand the requirement of 20 assembly/disassemble cycles without leaking, or a decrease in pressure resistance ability during the high-temperature leakage test.

(13) Sliding friction: although PFA surface has a self-lubrication characteristic, but a relative sliding friction between the sealed surface's compression ring and the tube wall may be generated during the fastening process. If there is a defect in sealed surface's tube wall, compression ring and conical surface, it may cause damages to the tube wall.

(14) Frictional risks: there is an occurrence of sliding friction during the entire fastening process of twisting the circumferential angle, causing a higher frictional risk of tube wall damages. The smaller the circumferential twisting angle, the lower is the frictional risk of sliding friction. Coupled with an adverse deformation of compression ring, there is a highest possibility of frictional risk on tube wall. It is especially obvious in the case of repeated assembly/disassembly cycles, the tube wall is likely to generate defects or damages and unable to withstand the requirement of 20 assembly/disassembly cycles without leaking.

(15) Sealing ability: high sealing ability is defined as the capability to meet high temperature test of higher than 150° C., the requirement to meet at least 20 assembly/disassembly cycles, high compression force ability Fn, low frictional risk and high pulling force resistance ability Ft. Inability to meet any one of the aforesaid conditions is deemed as basic sealing ability.

Figure 7A:
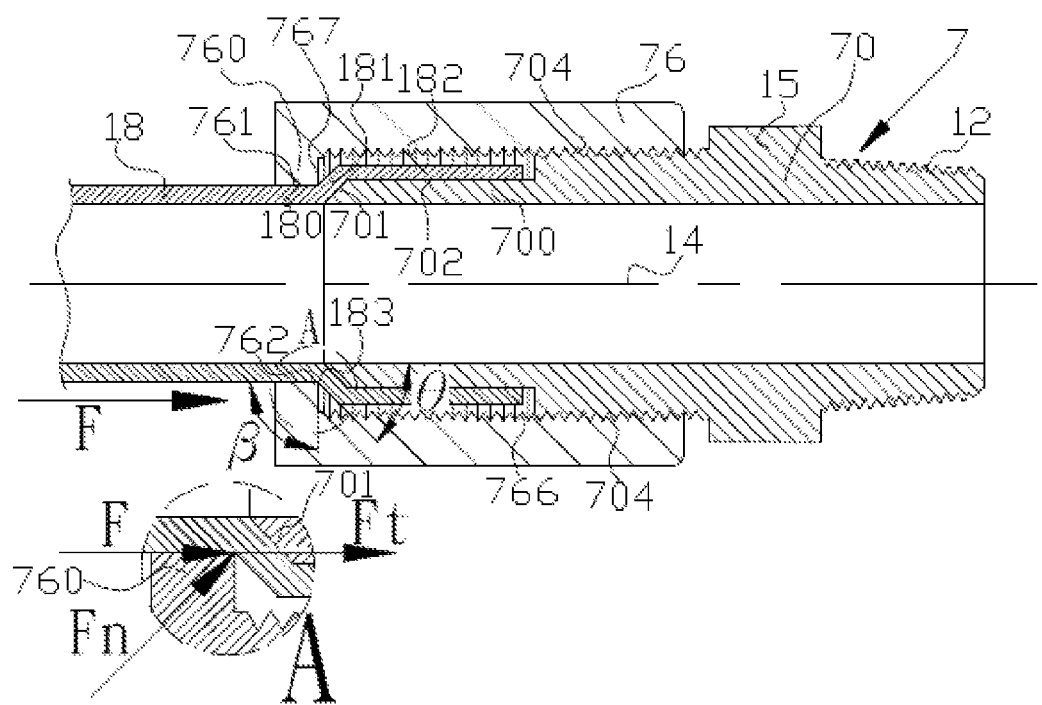

We can refer to the industrial safety requirements and precautions of various pipe joints made of PFA and other fluororesin materials to conduct unique structural designs to meet the needs to deliver pure fluids and reuse requirements. Currently, the earliest conventional sealing and anti-slipping off methods of PFA and other fluororesin tubes and pipe joints can be traced back to U.S. Pat. No. 3,977,708A in 1976. It featured a two-part structure comprising of a kind of pipe joint and a union nut, with the main function to compress the tube's outside diameter to achieve a sealing effect. The Japanese Patent JP61105391A in 1986 featured a three-part structure by adding a fixed ring at the interior of union nut. It also performed compression and clamping at the tube's outside diameter to achieve a sealing effect but was reinforced with stress resistance ability on the piping. Under the requirements to meet with delivering high-temperature and pressurized fluids, and higher reliability on pulling force and leakage for tubes, the Japanese Patent JP2052723A in 1990 and the U.S. Pat. No. 5,154,453A in 1992 had improved the full-embedded fixed ring at tube's interior wall with an embedded fixed ring at the inner wall of tube end. The following conventional pipe joint structures are derived from these methods:

Prima Facie Case 1: The conventional PFA pipe joint is shown in FIG. 7A. The two-part pipe joint (7) is comprised of a joint body (70) and a union nut (76).

The end portion of tube (18) is initially passed through the tapered opening (761) of union nut (76). After being cooled or heated by a jig, the expanded tube is transformed into a flared end (180) comprising of a cone tube (181) and a cylindrical tube (182).

The joint body (70) features a central through hole (14) to direct the fluid. One end of the tube connecting portion (700) is used to connect with union nut (76) and tube (18), the other threaded end (12) to connect with other equipment or device, and the central tool engaging portion (15) to install with pipe joint (7).

According to order, the tube connecting portion (700) is comprised of a conical surface (701), a tubular surface (702) and locking thread (704) designed to install the cone tube (181) of tube (18) with the cylindrical tube (182). The conical angle $\epsilon$ of conical surface (701) is generally closed to 45°, and the locking thread (704) is used to fasten with union nut (76).

The inner diameter of union nut (76) features a threaded part (766), an inner annular surface (767) and a tapered end (760). Its threaded part (766) is used to fasten with the locking thread (704) of tube connecting portion (700). The inner surface of tapered opening (761) located at the center of tapered end (760) has a compression ring (762) with a compression angle $\beta$ being generally closed to 90°.

During the locking process of union nut (76), the axial direction of extended tube (18) will compress the flared end (180). Its compression ring (762) and conical face (701) will compress the tube wall of conical face (181) together to form a sealed surface (183). This aims to achieve a sealing effect and prevent the tube (18) from subject to external stretch and slip off.

This cited case of sealing ability is known as basic sealing ability because the compression force F and the applied force angle $\gamma$ of conical surface (701) is closed to 0°, and the angle between the applied force is closed to 45°. As the compression force F features a significant horizontal distribution force Fn, it can only generate a basic compression force.

There is an existence of high frictional risk of sliding on the sealed surface (183) throughout the entire locking process. In order to achieve a sealing effect, an experienced operator is needed to carefully control the torque.

When the tube is subjected to a pulling force T, the compression force F features a large pulling distribution force Ft at opposite direction. However, as the angle of applied included angle $\theta$ is closed to 45°, it will cause Fn distribution force to fall and prevent the pulling resistance ability to improve further.

In addition, the U.S. Patent US2011210544A1 in 2009 has improved this cited case by changing the tapered end's inner surface of union nut into two different diameters in near 90° to become a compression ring with a dual-section sealed surface. As each applied force angle $\gamma$ is closed to 0°, and the applied force included angle $\theta$ is closed to 45°, there is a greater pulling resistant distribution force Ft at opposite direction but a reduced Fn distribution force. So, said structure is still unable to improve the pulling resistance ability, prompting said patent to increase the thickness at the tube connection portion and uses a high rigidity locking thread to improve the compression force F. Two compression rings and sealed surfaces have been used to improve the issue of insufficient normal line distribution force on conical surface. This has however, enlarged the outside diameter at the same time and needed a larger installation space. As an appropriate constraint has been made on the cylindrical tube's outer diameter of tube, said patent has thus generated a better sealing ability, but there is still an occurrence of sliding friction on the sealed surface throughout the entire locking process. So, such structure has still possessed a high frictional risk.

Figure 7B:
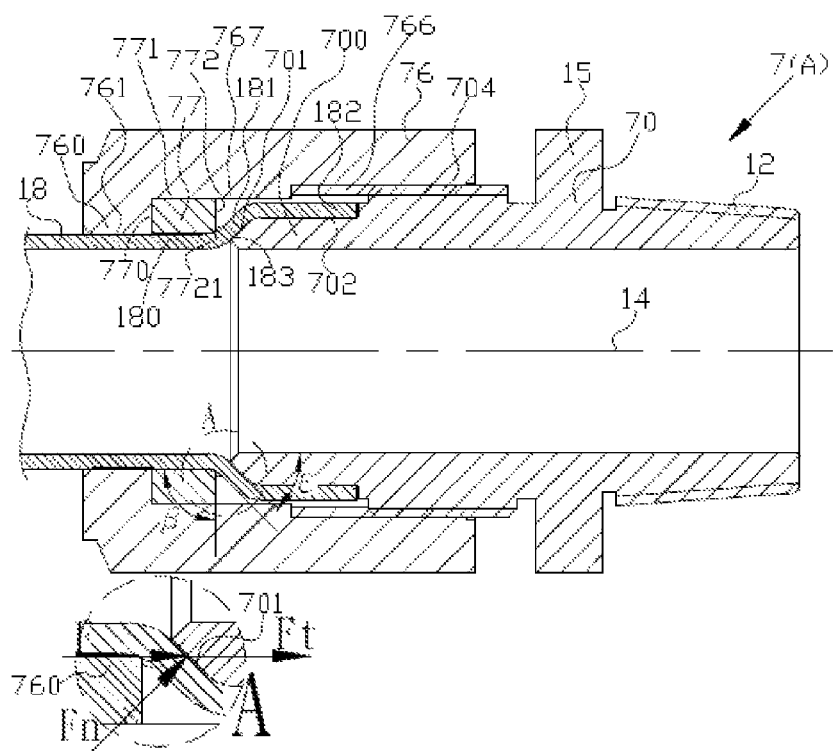
Figure 7C:
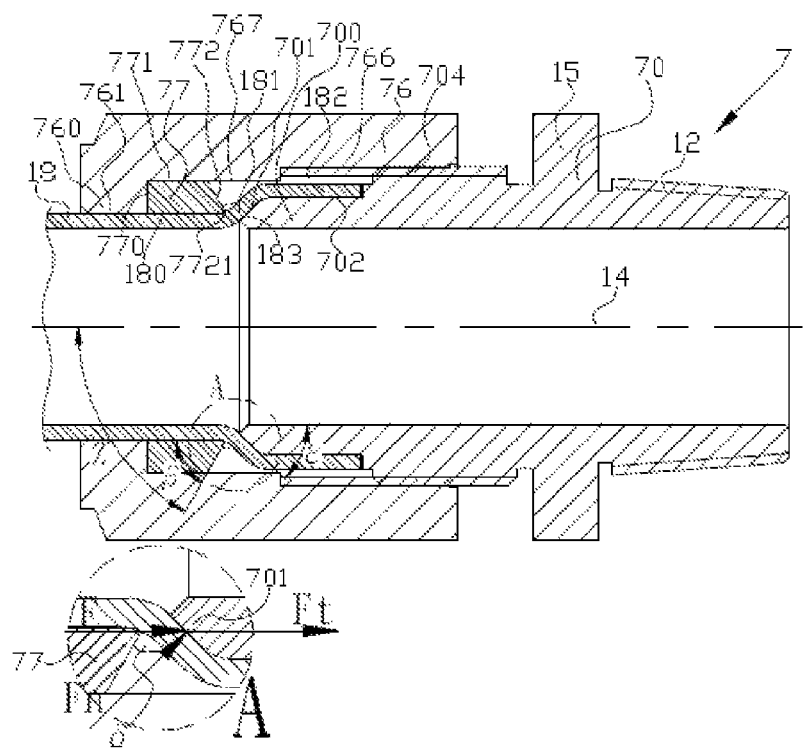

Prima Facie Case 2: As shown in FIG. 7B and FIG. 7C, the conventional technology is a structural extension of cited case 1 by adding a disc-shaped anchor plate (77) of hardness greater than tube (18) to increase the pulling resistance ability. This cited case emphasizes that it is able to meet the application conditions of high temperature, high pressure, external stretch and repeated stresses, as well as able to prevent damages caused by sliding friction during the locking process. The pipe joint (7A) is comprised of three parts, namely a joint body (70), a disc-shaped anchor plate (77) and a union nut (76).

The end of tube (18) is initially passed through the tapered opening (761) of the union nut (76) and the central bore of disc-shaped anchor plate. After being cooled or heated by a jig, the expanded hole is transformed into a flared end (180), comprising of a conical tube (181) and a cylindrical tube (182).

The joint body (70) features a central through hole (14) to direct the fluid. One end of the tube connecting portion (700) is used to connect with union nut (76) and tube (18), the other threaded end (12) to connect with other equipment or device, and the central tool engaging portion (15) to install with pipe joint (7A).

According to order, the tube connecting portion (700) features a conical face (701), a cylindrical face (702) and locking thread (704) designed to install the flared tube (181) of tube (18) to the cylindrical tube (182). The conical angle ϵ of the conical face (701) is generally closed to 45°, and its locking thread (704) is used to fasten with union nut (76).

The inner diameter of union nut (76) features a threaded part (766), an inner circular surface (767) and a tapered portion (760). The threaded part (766) is used to fasten to the locking thread (704) of tube connecting portion (700). The center of tapered end (760) has a tapered opening (761) with a plane surface at its inner face being generally constructed with an angle of near 90°, designing to couple with one side of the disc-shaped anchor plate.

The disc-shaped anchor plate (77), in fluorine material such as PVDF, has a hardness higher than PFA tube. As its outside periphery (771) is smaller than the diameter of inner ring surface (767), it can be installed within the union nut (76) interior. Its compression surface (770) can be abutted against the inner side of tapered end (760), and its central bore is roughly the same size as the tapered opening (761). Its compression surface (772) at the other end features a bulging conical angle Z with a bulging conical surface or a plane surface of specification 60°≤Z≤90°. There is a compression ring (7721) at the fringe of central bore with a compression angle β of specification 60°≤β≤90° with the purpose to avoid damaging the tube wall with a much smaller compression angle. It can be used to abut the tube wall of flared tube (181) on the conical face of tube connecting portion (700) to improve the pulling resistance force.

During the locking process of union nut (76), the axial direction of extended tube (18) will compress the flared end (180), causing the compression ring (7721) and conical surface (701) to compress the annular tube wall of conical surface (181) together to form a sealed surface (183).

This cited case of sealing ability is regarded as a basic sealing ability. The descriptions are as follows:

The compression angle γ is closed to 0°, the applied force included angle is closed to 45°, and there is a large pulling resistance distribution force Ft at opposite direction but a reduced Fn distribution force. Such structure is unable to improve the pulling resistance ability.

The reason of high frictional risk is due to the fact that the compressed surface (770) has been abutting on the inner side of tapered end (760) throughout the entire locking process, causing the disc-shaped anchor plate (77) to rotate and generating a sliding friction phenomenon on the sealed surface (183) during the locking process. In order to achieve a sealing effect, an experienced operator is needed to carefully control the torque. In addition, as it is unsure to maintain the disc-shaped anchor plate (77) at its center position during the locking process, it is thus unable to guarantee that the applied force angle γ of compression force F will cause an uneven non-annular or elliptical force distribution to reduce the sealing effect and pulling resistance ability.

In high-temperature applications, PVDF disc-shaped anchor plate is unable to meet high temperature test, such as 150° C. as subjected to temperature characteristic of the material. If softer PFA material is used in disc-shaped anchor plate (77), its compression ring (7721) will be restricted by the compression angle γ of near 0°, causing unfavorable stress deformation, and Fn distribution force will drop even lower and unable to meet with tensile test and high temperature test.

Figure 8:
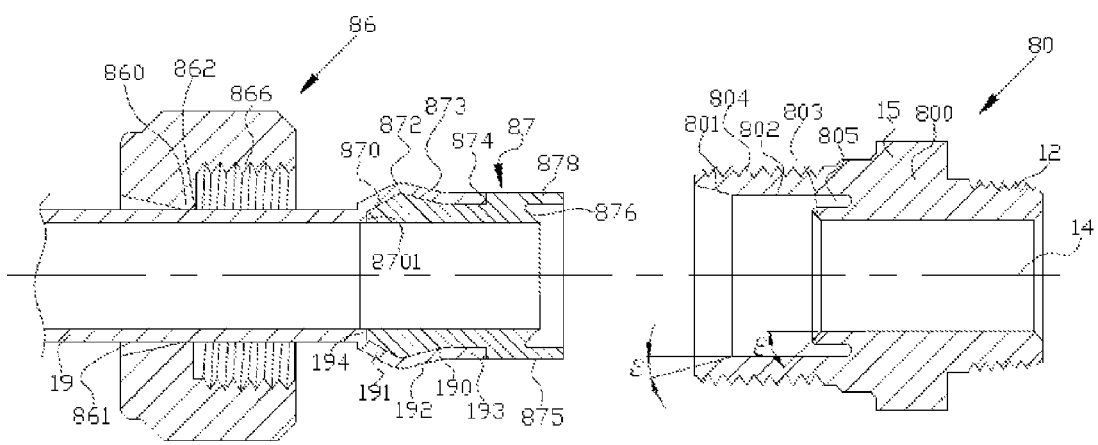
Figure 9:
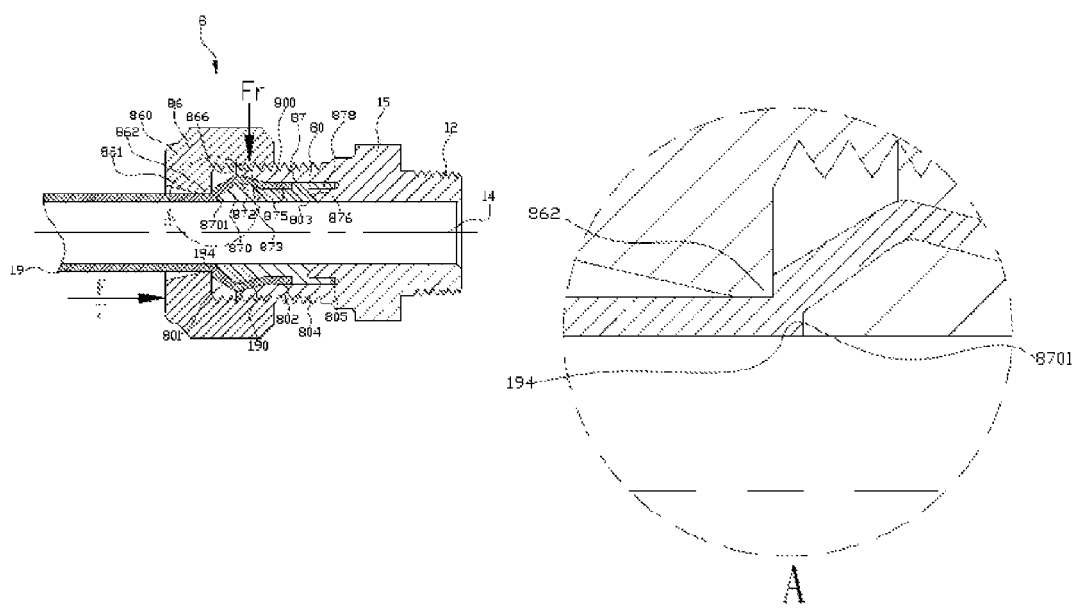

Prima Facie Case 3: As shown in FIG. 8 and FIG. 9, this cited case is abstracted from U.S. Pat. No. 6,776,440B2 in 2004 entitled "Method and Structure for Preventing Slipping-off of a Tube in a Pipe Joint Made of Resin." Such pipe joint (8) is comprised of a joint body (80), a union nut (86) and an embedded fixed ring (87), all being made of PFA material.

The end portion of tube (19) is initially passed through the tapered opening (861) of union nut (86). After being cooled or heated by a jig, the tube end is inserted with an embedded fixed ring (87) to allow the structural appearance of tube end to form a flared end that comprises of a front flared tube (191), a tapered tube (192), a cylindrical tube (193) and a sealed surface (194) with plastic deformation ability.

The joint body (80) features a central through hole (14) to direct the fluid. One end of the tube connecting portion (800) is used to connect with union nut (86) and tube (19), the other threaded end (12) to connect with other equipment or device, and the central tool engaging portion (15) to install with pipe joint (8).

According to order, the tube connecting portion (800) features a front inner conical surface (801), an inner cylindrical surface (802), a bulging inner conical surface (803), locking thread (804) and a slot (805). The said slot (805) is positioned between the inner cylindrical surface (801) and the bulging inner conical surface (803). The front inner conical surface (801) and the bulging inner conical surface (803) come in different ϵ angles designed to install with embedded fixed ring (87). Meanwhile, the locking thread (804) is used to fasten with union nut (86).

The inner diameter of union nut (86) features a threaded part (866) and a tapered end (860), the threaded part (866) of which is used to fasten with locking thread (804) of tube connecting portion (800). The inner surface of tapered opening (861) located at the center of tapered end (860) has a compression ring (862) with a compression angle β of generally close to 90°.

The embedded fixed ring (87) features a hollow tubular structure, comprising of a front conical surface (870), a maximum diameter (872), a tapered conical surface (873), a trust end (874), a tubular surface (875), a recessed inner conical surface (876) and a bulging ring (878). This bulging ring (878) is located between the tubular surface (875) and the recessed inner conical surface (876). A special jig must be used to insert the embedded fixed ring (87) into the inner side of tube (19) from the end portion. The front conical surface (870), maximum diameter (872) and tapered conical surface (873) are all being clad by the flared end inside the tube opening (19) and being pressed against the trust end (874). The conical angle ε of front conical surface (870) is generally less than 45°. A compression surface of near 90° found at the front conical nose tip (8701) of front conical surface (870) is designed to coordinate with the sealed surface (194) of tube wall with plastic deformation ability. At the other end of the embedded fixed ring (87) are a tubular face (875) and a bulging ring (878), with an inner conical surface (876) at its inner diameter.

The installation procedure is to insert the tubular surface (875) of embedded fixed ring (87) into the inner ring surface (802) of joint body (80). The bulging ring (878) will then be inserted into the slot (805) firmly, thereby combining the recessed inner conical surface (876) with the protruding inner conical surface (803) tightly.

During the locking process of union nut (86), the axial direction of extended tube (19) will compress the flared end (190) through using the compression ring (862) of union nut (860) and the front conical nose tip (8701) of front conical face (870) to press against the tube wall to form a sealed surface (194), thereby achieving a sealing effect and preventing said tube (19) from being subjected to external stretch and slip off.

This cited case of sealing ability is regarded as a basic sealing ability. The descriptions are as follows:

It features a better compression ability as its compression force F is exerted on the compression surface of front conical nose tip (8701) perpendicularly, and that the sealed surface (194) has already been reinforced by pressing with a special jig to generate a plastic deformation phenomenon. This is known as the first sealed part. The compression angle γ is closed to 0°, the applied force included angle θ is also closed to 0°, and there is a great pulling resistance distribution force Ft at opposite direction and Fn distribution force is also very high. Such structure is able to improve the pulling resistance ability significantly.

Under high temperature, the structure of front conical nose tip (8701) of the first sealed part is relatively thin and weak. If the material strength falls, the compression exerted by compression ring (862) will cause the front conical nose tip (8701) to deform easily and lower the compression force on the tube wall of sealed surface (194). This will still increase the leakage risk problem.

The tapered tube (192) of tube (19) is simultaneously compressed and sealed tightly by the tapered conical surface (873) of embedded fixed ring (87) and the inner conical surface (801) of joint body (80). This is known as the second sealing section.

The flared end (190) of second sealed part is related to tube wall thinning on maximum diameter (872) and an enlarged tolerance. This is particularly obvious under high temperature as its compression strength will drop and not beneficial to use tube wall thickness in compression sealing.

The cylindrical tube surface (875) of embedded fixed ring (87) is secured by the inner ring surface (802) of tube connecting portion (800), and bulging ring (878) being embedded into the slot firmly. The inner recessed conical surface (876) will then couple and seal with the bulging inner conical face. This is known as the third sealing section.

The complex coupling structural strength of third sealing section is relatively weak as it tends to deform under high temperature and during the compression process. The structural weakness and complexity between the joint body (80) and the interior of embedded fixed ring (87) is easily subjected to stress and deform, generating a gap to contain liquid residue. As the structural weakness of said third sealing section can lead to frequent deformations, there is a need to use a special jig to remove the embedded fixed ring (87) from joint body (80) during maintenance. This can easily damage the embedded fixed ring (87) and has to replace the entire fixed ring (87) and joint body (80), causing inability to reuse the pipe joint (8), and increase maintenance time and material costs.

The reason of high frictional risk is caused by sliding friction on the sealed surface during the locking process. Although the sealed surface (194) has been hardened by the jig, but there is an existence of direct sliding friction throughout the entire locking process to generate a very high frictional risk. To achieve a sealing effect, an experienced operator is needed to carefully control the torque, including a possibility for being unable to meet the requirement of withstanding 20 assembly/disassembly cycles without leaking.

This cited case is gradually modified from relevant Japanese Patent JPH02117494U in 1990 and U.S. Pat. No. 5,154,453 in 1992. Although there has been a slight improvement in the sealing effect and pulling resistance ability, but it still faces the entire structural complexity issue for being easily deformed and a possibility to replace the embedded fixed ring (87) and pipe joint (80), etc. Furthermore, a need to use a special jig will also increase the construction and maintenance burden and costs. As the sliding friction will occur throughout the entire locking process, it is unable to lower the risk of tube wall damages, including a possibility for being unable to meet the requirement of withstanding 20 assembly/disassembly cycles without leaking.

Prima Facie Case 4: As referred to Japanese Patent JP4208226b2 in 2009, the cited case 4 stresses that the pipe joint is able to withstand the application conditions of high temperature, high pressure, external pulling force and repeated compressions. It comprises of three major parts and an auxiliary part, namely a joint body, a union nut and a C-shaped axial compression ring, as well as a disc-shaped anchor plate containing a compression ring to serve as an auxiliary part.

The tube end portion is initially passed through the tapered opening of union nut and the central bore of compression ring. It is also necessary to pass through the central bore of disc-shaped anchor plate should there be one. After being cooled or heated by a jig, the expanded hole is transformed into a flared end, comprising of a conical tube and a cylindrical tube.

The central through hole of joint body is used to direct the fluid, and one end of the tube connecting portion to fasten with said union nut and tube.

According to order, the pipe joint features a conical surface, a tubular surface and locking thread designed to install with the flared tube and cylindrical tube of tube. The conical angle ε of conical surface is generally closed to 45°, and its locking thread is used to fasten with union nut. The said cylindrical tube surface comes with an arch-shaped slot.

The inner diameter of union nut features a threaded part, a bulging ring and a tapered end. The threaded part is used to fasten the union nut to the locking thread of tube connecting portion. The inner side of tapered opening located at the center of tapered end has a compression ring with a compression angle β of generally close to 90°, and the inner side of tapered opening can be installed with a disc-shaped anchor plate. There is a bulging ring located at the bottom of inner diameter, but its diameter is smaller than the inner diameter of threaded part and slightly larger than the external diameter of disc-shaped anchor plate and the external diameter of cylindrical tube. It is used to abut the compression ring in radial direction to achieve a radial bending and contraction deformation, as well as pressing it against the arch-shaped slot found on the tube wall of cone tube. The annular compression surface at such place is known as a sealed surface to serve the purposes of tube sealing and pulling resistance.

The C-shaped radial compression ring is made of a harder material than the tube and joint body, showing a cross-section area of a thinner central portion and a thicker and flat structure on both edges containing an inner recessed ring on the inner diameter. One of the sides has a compression ring with a compression angle β<45°. When compressed by the bulging ring of union nut, its end with the compression ring is able to perform a radial bending and contraction deformation.

During the locking process of union nut, the axial direction of extended tube will compress the flared end. Its bulging ring will compress one end of the compression ring to form a radial bending and contraction deformation. This will force the cone tube be pressed radially against the arch-shaped slot of cylindrical surface, causing the tube wall thickness on the sealed surface be compressed to generate a compression deformation, thereby achieving a sealing effect and preventing the tube from being subjected to external stretch and slip off. This is known as the first sealed surface.

The disc-shaped anchor plate comes in harder material than the tube and only used when there is a need to strengthen the tube pulling resistance of pipe joint. It is installed at the tapered opening's inner side of union nut. Its central bore comes in same size as the tapered opening, with one side being pressed against the tapered opening's inner side, and the other side having a bulging conical face with a bulging conical angle Z of specification 60°≤Z≤90°. It also features a compression ring at the fringe of central bore with a compressing angle β of specification 60°≤β≤90°. This compression angle cannot be smaller than 60° as too small of it will damage the tube wall. It can be used to abut the conical tube's wall at the tube connecting portion's conical face to form a sealed surface to enhance pulling resistance. This is known as the second sealed surface.

This cited case of sealing ability is regarded as a basic sealing ability. The descriptions are as follows:

In this first sealed surface, the compression angle γ is closed to 90°, the compression included angle θ is closed to 0°, and there is a small pulling resistance distribution force Ft at opposite direction and a very high Fn distribution force. The opening on the compression ring will lower its uniform stress of compression structure. If no disc-shaped anchor plate is used, this structural compression force will be high but the pulling resistance will be low. Meanwhile, no sliding friction will occur on the radial compression ring to reduce the risk of tube wall damages.

If a disc-shaped anchor plate is used, the compression ring on the second sealed surface will compress the conical face directly with a compression angle γ in near 0°, a compression included angle in near 45°, and a large pulling resistance distribution force Ft but a reduced Fn distribution force. Such structure is still unable to improve the pulling resistance ability and is identical to the result found in cited case 2. In addition, as it is hard to ensure that the disc-shaped anchor plate will maintain at its central position during the locking process, it is thus unable to guarantee that the applied force angle γ of compression force F will generate an uneven non-annular or elliptical uneven force distribution to reduce the sealing effect and pulling resistance ability.

In high-temperature applications, PVDF disc-shaped anchor plate is unable to meet high temperature test, such as 150° C. as restricted by the temperature characteristic of the material.

In addition, as the disc-shaped anchor plate is pressed against the tapered opening's inner side of union nut, it may rotate to generate a sliding friction on the second sealed surface during the locking process, and so unable to lower the frictional risk of tube wall damages.

Prima Facie Case 5: As referred to the Taiwanese Patent TW-1335395 in 2011, the cited case stresses that the pipe joint is able to withstand the application conditions of high temperature, high pressure, external pulling force and repeated compressions. It can also prevent damages caused by sliding friction during the locking process. This pipe joint (1) is comprised of three major parts, namely a joint body (10), a union nut (16) and a dual-cone fixed ring (17).

The end portion of fluororesin tube (18) is initially passed through the tapered opening (161) of the union nut (16) and the central bore (179) of dual-cone fixed ring (17). After being cooled or heated by a jig, the expanded hole is transformed into a flared end (180), comprising of a conical tube (181) and a cylindrical tube (182).

The joint body (10) features a central through hole (14) to direct the fluid. One end of the tube connecting portion (100) is used to connect with union nut (16) and tube (18), the other threaded end (12) to connect with other equipment or device, and the central tool engaging portion (15) to install with pipe joint (1).

According to order, the tube connecting portion (100) features a conical face (101), a cylindrical face (102), a trust end (103) and locking thread (104) designed to install with cone tube (181) and cylindrical tube (182) of tube (18). The conical angle ε of the conical face (101) is generally closed to 45°, and its locking thread (104) is used to fasten with union nut (16).

The inner diameter of union nut (16) features a threaded part (166), an inner annular surface (167), an inner recessed conical surface (162) and a tapered end (160). The threaded part (166) is used to fasten with the locking thread (100) of tube connecting portion (100). The inner diameter space of inner ring (167) is used to install with dual-cone fixed ring (17). Its inner diameter is slightly bigger than the outer diameter of dual-cone fixed ring (17) and the center of tapered end (160) has a tapered opening (161), the inner side of which has a conical surface (162) with a conical angle Φ of specification 30°≤Φ≤45°. It is able to couple with the bulging conical surface of dual-cone fixed ring (17).

The harder PVDF dual-cone fixed ring (17) has a central bore (179) and a trapezoid cross-section area, featuring an annular bulging conical surface (170) with a conical angle Φ on both ends, a shorter axial length on the outer periphery (171), a central bore (179) with a longer axial length, and a compression ring (1701) on the conical surface (170) near the central bore (179) to abut the tube wall. As its compression angle β is equal to conical angle Φ 30°≤β≤95° and 30°≤Φ≤95°, its bulging conical surface (170) on one side will couple with the inner recessed conical surface (162) of union nut (16) to become a sliding surface.

During the locking process of union nut (16), the axial direction of extended tube (18) will compress the flared end (180) of cone tube (181) to become a sealed surface (183), causing the dual-cone fixed ring (17) to maintain at the center position by means of the inner recessed conical surface (162). Meanwhile, a sliding friction is generated due to the coupling sliding face between the dual-cone fixed ring (17) and the union nut (16). This will not create a sliding friction on the sealed surface (183), and the compression force F will then be transmitted to the conical surface (170) of dual-cone fixed ring (17) through the inner recessed conical face (162) of union nut (16). The process will allow the compression ring (1701) and the conical surface (701) of tube connecting portion (100) to abut the cylindrical tube wall of conical tube (181) to become a sealed surface (183), thereby achieving a sealing effect and preventing the tube (18) from being subjected to external stretch and slip off.

This cited case of sealing ability is regarded as basic sealing ability. The descriptions are as follows:

The outer diameter of dual-cone fixed ring (17) is smaller than the inner diameter of union nut (16), and there is a dimensional tolerance of their conical angles Φ. These two factors may prevent the dual-cone fixed ring (17) to maintain at the center position due to its skew position, causing an abnormal non-concentric phenomenon on the stress contact point to result in uneven non-annular or elliptical distribution on applied force angle γ of compression force F. The applied force will also be affected by the conical angle Φ. However, these angles are unstable in circumferential distribution, and basically, they will also show significant horizontal distribution force to cause the normal line distribution force Fn to lower its compression force on the sealed surface (183).

Although there is a large pulling resistance distribution force Ft on the pulling resistance direction, but there is a decrease in Fn distribution. So it is unable to further enhance the pulling resistance ability and also unfavorable for the tube wall to generate a continuous annular cumulative deformation.

When the dual-cone fixed ring (17) is unable to maintain at the center position, the coupling conical face will not be able to maintain its correct sliding motion and allow the dual-cone fixed ring (17) to rotate together. This will cause a sliding friction on the sealed surface (183) and will still generate a high frictional risk.

In high-temperature applications, the dual-cone fixed ring (17) is unable to meet high temperature test, such as 150° C. as restricted by the temperature characteristic of the material. If softer PFA material is used on dual-cone fixed ring (17), its applied force angle γ of compression ring (1701) will be restricted being affected by the conical angle Φ to cause an unfavorable stress deformation, and Fn distribution force will even fall and unable to meet the pulling resistance test and high temperature test. When dual-cone fixed ring (17) is replaced with a softer PFA material, its compression ring (1701) will demonstrate an even greater deformation, causing Fn distribution force to fall even lower and result in poorer sealing ability.

Many solutions have been proposed on how to improve the pulling resistance ability of tube. Both U.S. Pat. No. 5,472,244A in 1995 and U.S. Pat. No. 6,543,815B2 in 2003 have put forward different solutions to prevent complete pulling-off of tube, but they require more specialized tools to install. In technology respect, both cases have an applied force angle γ roughly close to 0°, applied force included angle θ close to 45°, a lower Fn distribution angle, and a significant effective pulling resistance distribution force Ft, but their overall sealing abilities have merely reached the basic sealing ability and not high sealing ability.

The aforesaid pipe joint structures are able to meet different sealing and anti-slipping off effectivenesses, but there are still room for improvement. Hence, this innovation proposes a further improvement to overcome the shortcomings of above cited cases to use a kind of perfluororesin material, in particularly full-PFA for the pipe joint. It has a high sealing ability to meet high temperature test of over 150° C., at least 20 assembly/disassembly cycles requirement, high compression Fn ability, low frictional risk, high pulling resistance Ft ability, and capable of giving early pre-warning in the event of minute leakage. It also features the advantages of simple structure, easy installation, low costs, and able to meet industry safety requirements in delivering pure fluids.

SUMMARY OF THE INVENTION

The main purpose of the present invention is to provide a kind of perfluoreresin pipe joint with high sealing ability that able to meet industry safety requirements in delivering pure fluids.

The structural characteristics of this innovative pipe joint are as follows: It is able to ensure keeping the fixed ring in the center position, allowing the compression force F to distribute in a better concentricity. Coupled with the conical angle ϵ on the conical face of joint body, it has created an applied force included angle as close as 10° to improve the conical face normal line distribution force on tube connecting portion, and has an effective conical thickness to clamp on the tube. The followings are the features of this innovation:

Feature 1: The pipe joint is made up of three parts, namely a joint body, a union nut and a fixed ring. Its conical angle ϵ of conical surface on joint body is 50°≤ϵ≤90°.

Feature 2: The fixed ring is able to maintain in the center position by means of a guiding mechanism.

Feature 4: The applied force ring edge of the inner recess portion at inner side of union nut is able to form a coupling sliding motion and transmit a compression force F. The contact area of said coupling sliding is restricted to a certain range to ensure that the sliding condition is able to lower the frictional risk of sliding on the sealed surface.

Feature 4: The position of stress ring edge is able to coordinate with the conical angle ϵ of conical surface, with an applied force angle γ of compression force F of specifications 0°≤γ≤30° and 1≥(Ft/F)≥0.86; and an applied force included angle θ of specifications 0°≤θ≤15≤θ≤ and 1≥(Fn/F)≥0.96. They are meant to enhance the compression effect on sealed surface and the pulling resistance ability of pipe joint.

Feature 5: As the compression angle β of compression ring is 50°≤β≤75°, it will allow the tube wall to generate a continuous cumulative deformation and increase the pulling resistance ability.

Feature 6: There is sufficient axial length on the outer periphery of cylindrical fixed ring to install with an indicator paper strip to help detect any cause of minute leakage during high-corrosive and high-toxicity applications.

This innovative fluororesin pipe joint is assembled with a fluororesion tube at one end, comprising of a joint body, a union nut and a fixed ring.

The tube end is initially passed through the tapered opening of union nut and central bore of fixed ring. After being cooled or heated by the jig, the tube is expanded to become a flared end containing a cone tube and a cylindrical tube.

The joint body features a central through hole to direct the fluid. One end of the tube connecting portion is used to connect with union nut and flared end, the other threaded end to connect with other equipment or device, and the central tool engaging portion to install with pipe joint.

The tube connection portion includes: the locking thread, a conical surface and a cylindrical surface. The locking thread is used to fasten with union nut, and the conical surface and cylindrical surface are used to install with cone tube and cylindrical tube of the tube. The specification of the conical angle $\epsilon$ of conical face is $50°\leq\epsilon\leq90°$. When the conical angle is $90°$, the conical surface is in vertical position, helping the cylindrical surface of tube to have sufficient thickness to withstand a compression force to generate an even deformation. The preferred thickness is at least 1.6 times greater than the tube wall thickness.

The fixed ring features a central bore and a bulging portion on both edges. One of the edges closer to the central bore has a compression ring capable of pressing the conical tube's wall on the conical face truly, and the fringe of central bore has a sufficient lead angle space to avoid the compression ring from pressing on the small conical radius spot of cone tube as said spot is prong to generate a wall hardening phenomenon to prevent achieving an ideal sealing on the sealed surface. The compression angle $\beta$ of compression ring comes in specification of $50°\leq\beta\leq75°$. The fixed ring has a near trapezoid, symmetric or asymmetric cross-section area with a shorter axial length on the outer diameter and a longer axial length on the central bore. One end of it has a bulging portion that extends from the outside diameter towards the smooth center that has a stress ring's curved surface, with the purpose to contact with the applied force ring edge of union nut to form a coupling siding surface. As this coupling sliding surface is limited to a certain range, it is able to reduce dimensional tolerance of both parts to ensure a sliding motion on the coupling surface.

The outer diameter of fixed ring features an annular slot to install with an indicator paper strip. In the event of an increasing minute leakage volume on pipe joint's sealed surface, this indicator paper will change color, such as red or blue in accordance with its response to acid or alkali. As the union nut comes in translucent color, the color-changing phenomenon of the indicator paper can be easily observed from outside. After using the pipe joint for an accumulated time, the minute leakage volume can also be accumulated to cause a chemical reaction on the test fluid. This can be used as a reference to establish a time table to conduct regular maintenance on the pipe joint.

The inner diameter of union nut has a threaded part and a tapered end, the former is used to fasten the union nut to the locking thread of tube connecting portion. Its central tapered portion has a tapered opening with a smooth inner recess portion on the inner side, comprising of an applied force ring edge to couple and abut the stress ring edge of fixed ring to form a coupling sliding face. As the contact surface of this coupling sliding surface is limited to a certain range, it is able to reduce dimensional tolerance of both parts to ensure that the sliding phenomenon will not generate unfavorable effect to lower the frictional risk of sliding on the sealed surface.

During the locking process of union nut, the axial direction of extended tube will compress the flared end of cone tube to become a sealed surface. Coupled with its compression angle $\beta$ of specification $50°\leq\beta\leq75°$, it will cause the tube wall to generate a continuous cumulative deformation to increase the pulling resistant ability. The frictional risk of sealing face sliding will then drop to its lowest through the sliding motion on the coupling surface of fixed ring. Coupled with the conical angle $\epsilon$ of conical surface, the compression force F will transmit the coupling sliding surface to compression ring and exert on the sealed surface. The applied force angle $\gamma$ of compression force F of specification $0°\leq\gamma\leq30°$ and the applied force included angle $\theta$ of specification $0°\leq\theta\leq15°$ will then be able to improve the normal distribution force Fn and generate a greater pulling resistance distribution force Ft. During the locking process, the fixed ring will maintain at the center position by means of a guiding mechanism, being capable of using the recess portion of union nut in accordance with the structure of tube connecting portion, or the inner periphery of tube connecting portion, or both of them to simultaneously maintain at a concentric position. The tube will then be able to achieve a sealing effect and prevent it from being subjected to external stretch and slip off through the aforesaid locking process.

The sealing ability of this innovation is regarded as a high sealing ability. Its descriptions are as follows:

The fixed ring will maintain at a center position during the locking process, allowing the compression force F to be distributed at a better concentricity and a more uniform stress distribution on the sealed surface. After conducted with a 150° C. high-temperature baking procedure on the pipe joint, it has found to be able to withstand 7 kg/cm² of pressure requirement without leaking.

While performing a tensile test on the tube, its plastic deformation length has been found to reach twice its original length.

A low frictional risk is the result of coupling sliding, being able to maintain a sliding motion to allow the sealed surface to generate a static compression on the sealed surface, thereby lowering the frictional risk significantly.

BRIEF DESCRIPTIONS OF THE DRAWINGS

FIG. 1A: The structural cross-section view showing the 1st embodiment example of pipe joint of the present invention.

Figure 1B:
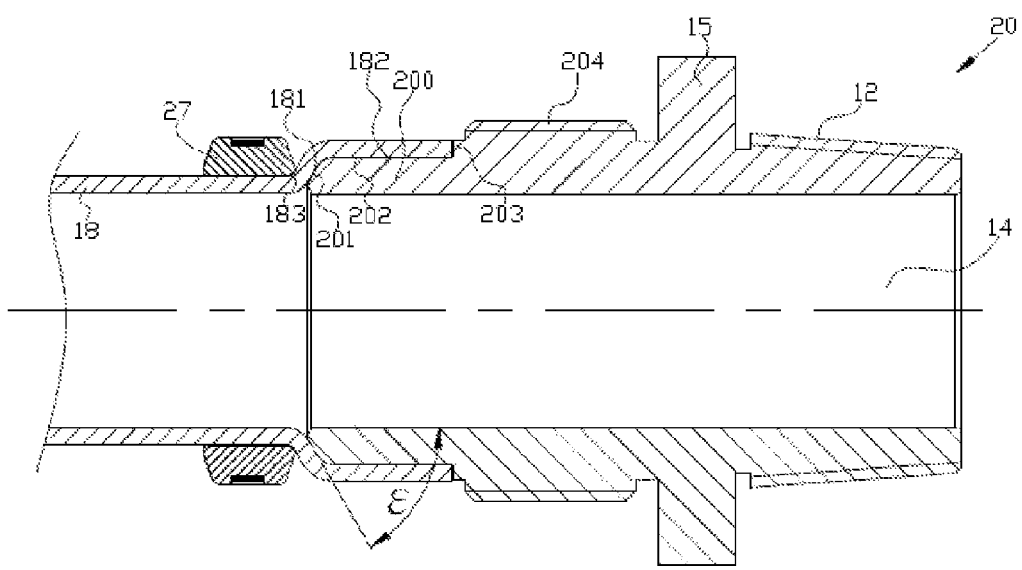

FIG. 1B: The diagram showing the 1st embodiment example of joint body of the present invention.

Figure 1C:
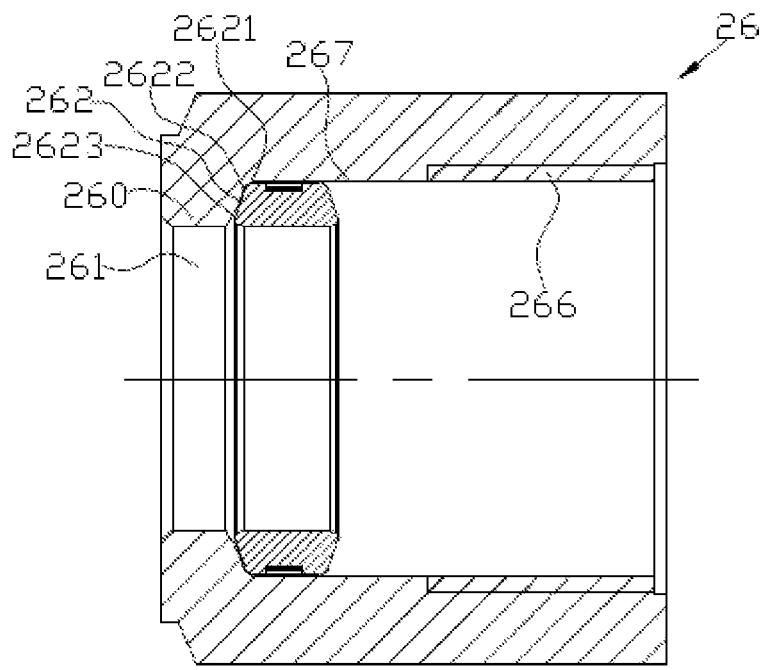

FIG. 1C: The diagram showing the 1st embodiment example of union nut of the present invention.

Figure 1D:
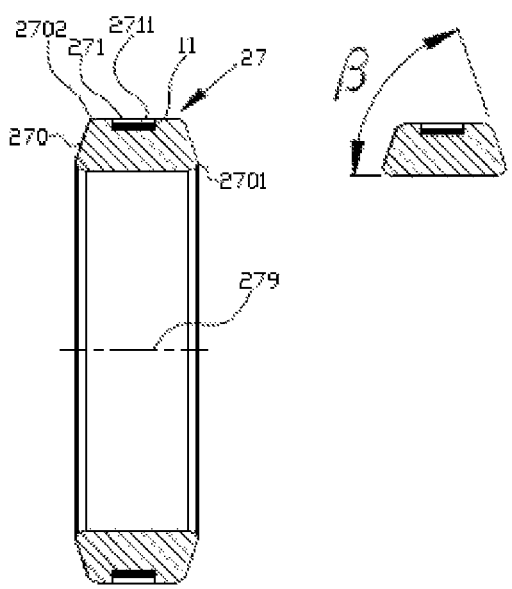

FIG. 1D: The diagram showing the 1st embodiment example of fixed ring of the present invention.

Figure 1E:
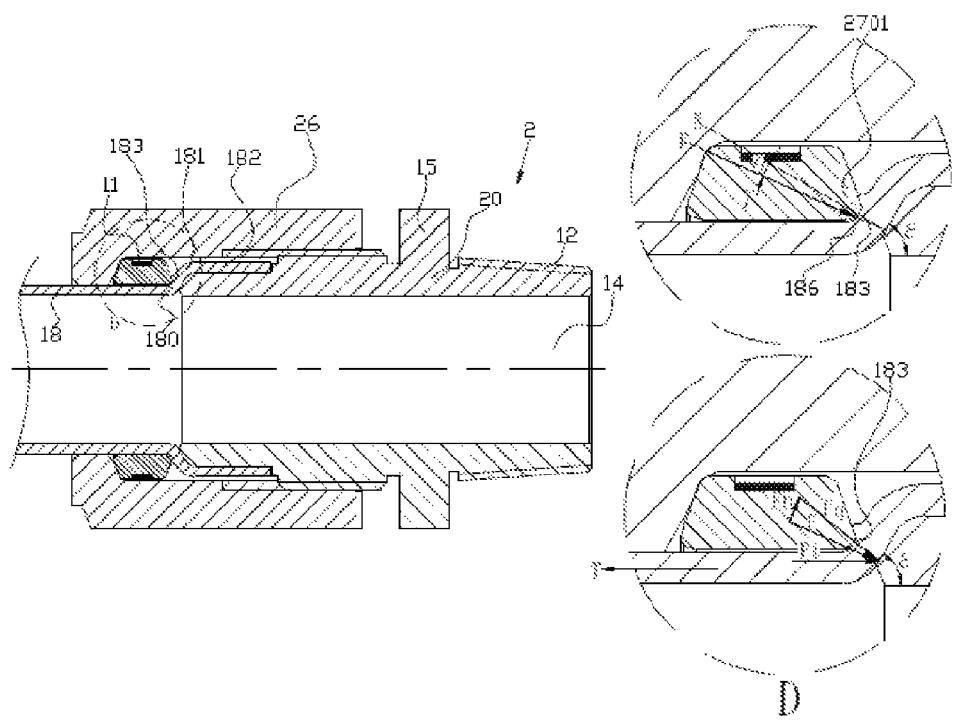

FIG. 1E: The diagram showing the 1st embodiment example of fastening and compression of the present invention.

Figure 2A:
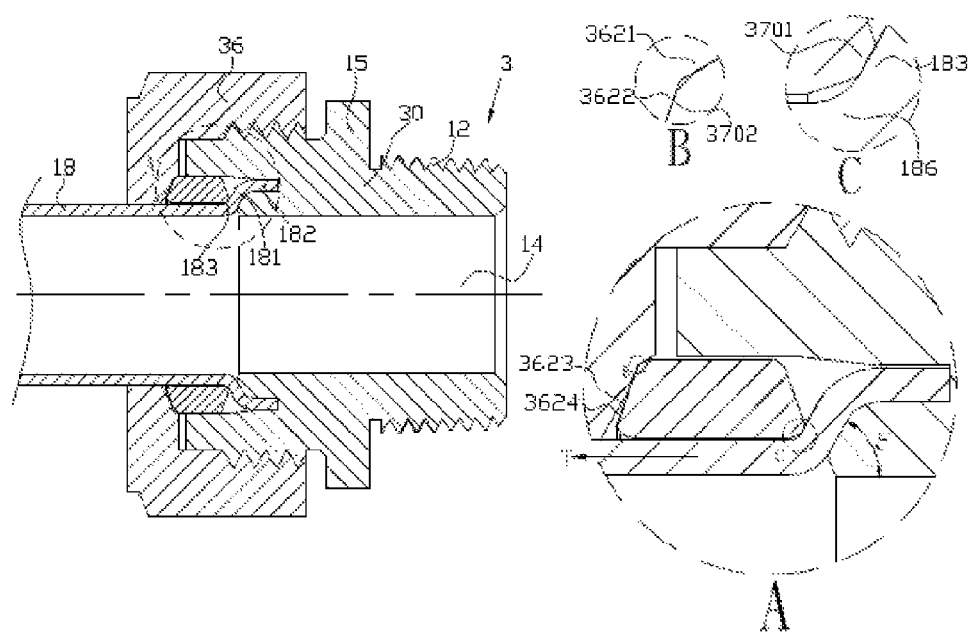

FIG. 2A: The structural cross-section view showing the 2nd embodiment example of pipe joint of the present invention.

Figure 2B:
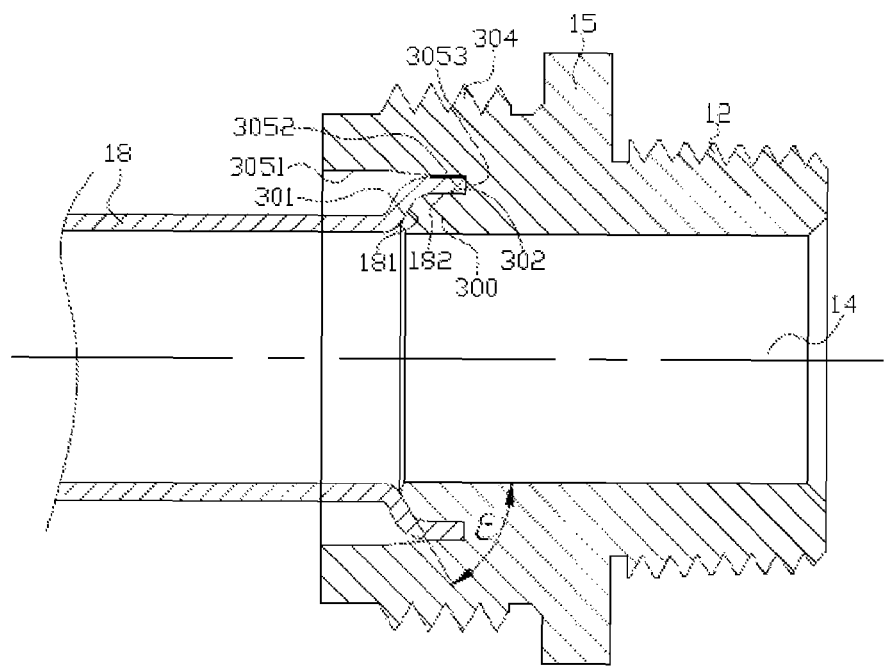

FIG. 2B: The diagram showing the 2nd embodiment example of joint body of the present invention.

Figure 2C:
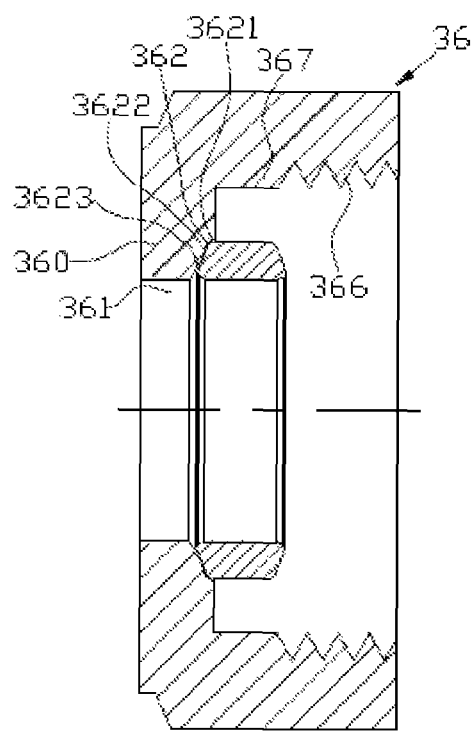

FIG. 2C: The diagram showing the 2nd embodiment example of union nut of the present invention.

Figure 2D:
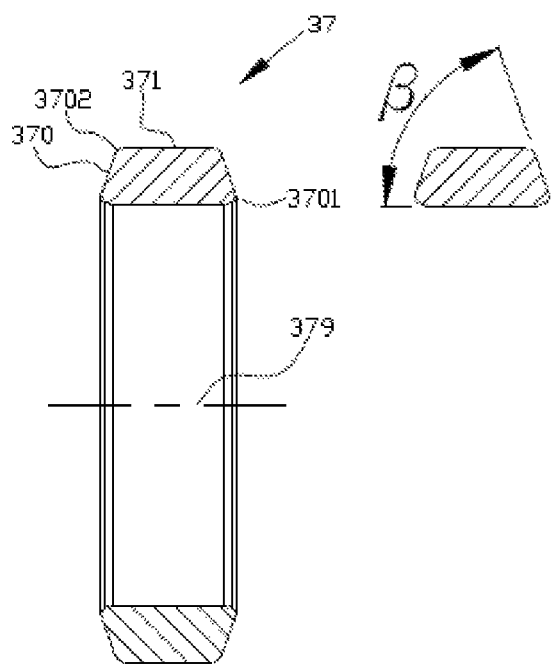

FIG. 2D: The diagram showing the 2nd embodiment example of fixed ring of the present invention.

Figure 2E:
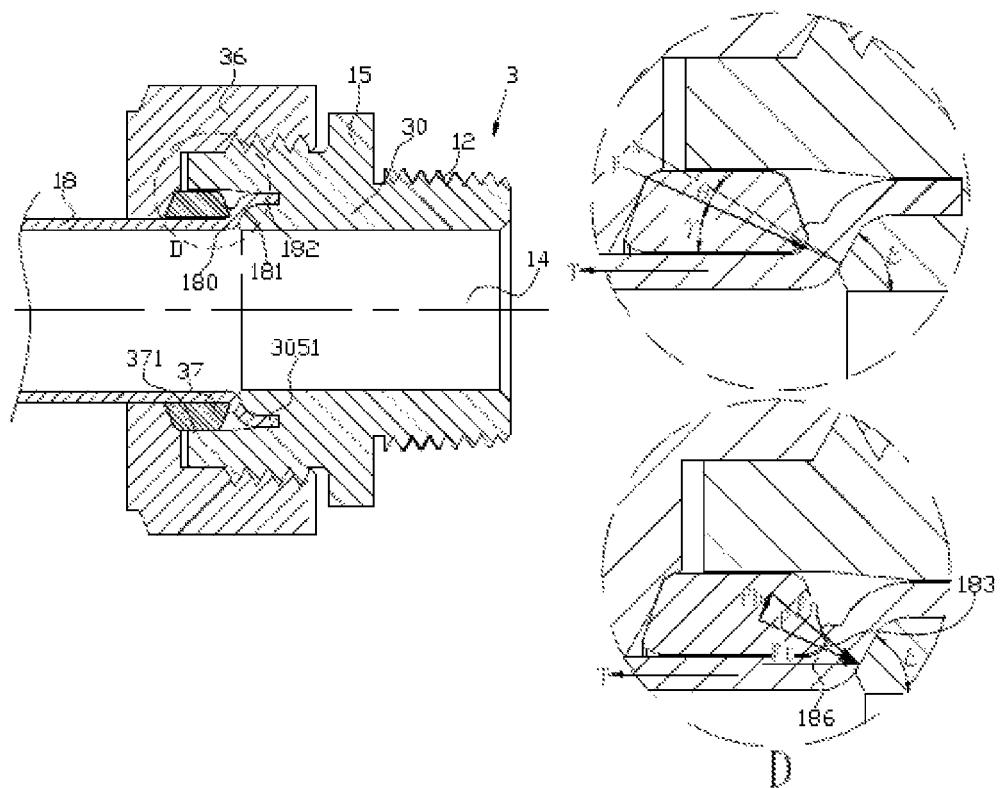

FIG. 2E: The diagram showing the 2nd embodiment example of fastening and compression of the present invention.

Figure 3A:
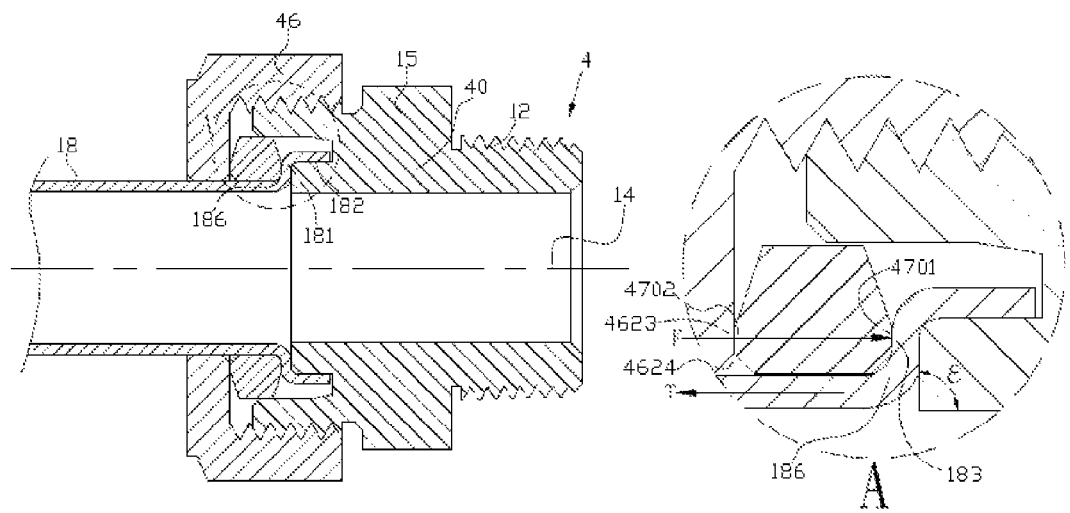

FIG. 3A: The structural cross-section view showing the 3rd embodiment example of pipe joint of the present invention.

Figure 3B:
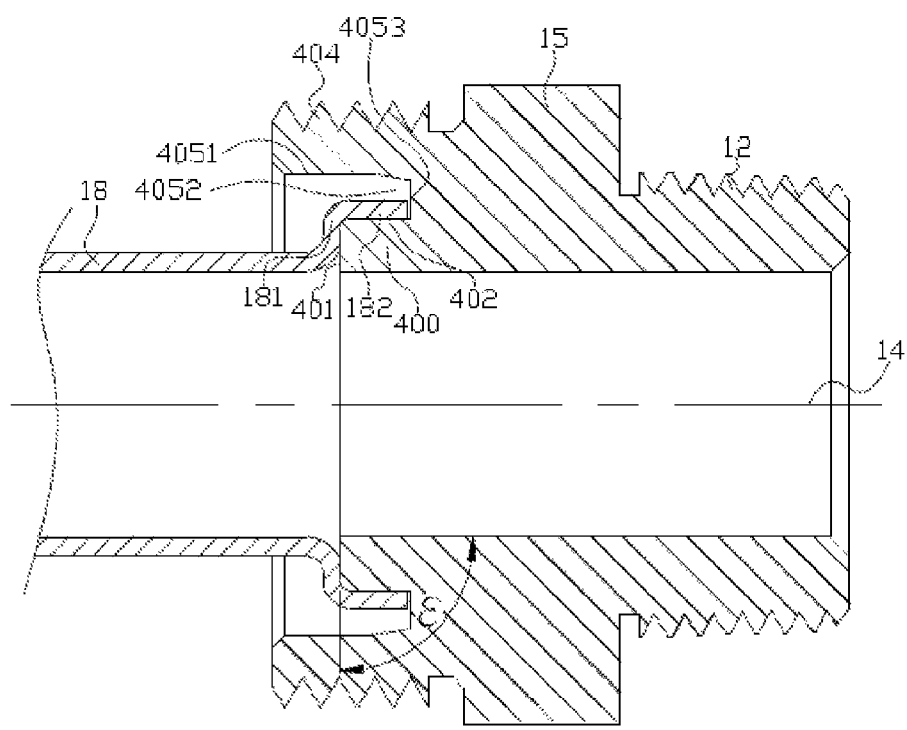

FIG. 3B: The diagram showing the 3rd embodiment example of joint body of the present invention.

Figure 3C:
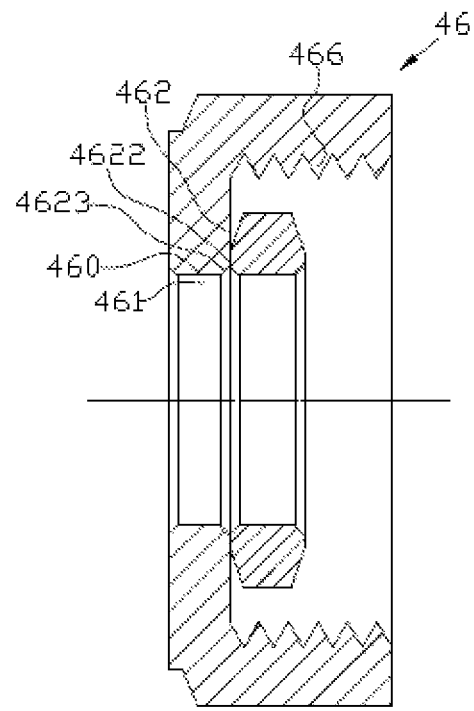

FIG. 3C: The diagram showing the 3rd embodiment example of union nut of the present invention.

Figure 3D:
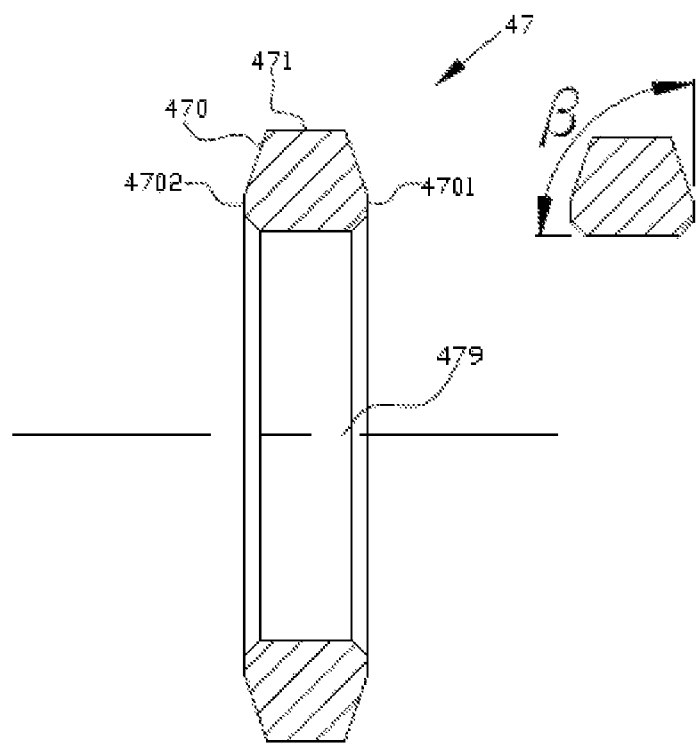

FIG. 3D: The diagram showing the 3rd embodiment example of fixed ring of the present invention.

Figure 3E:
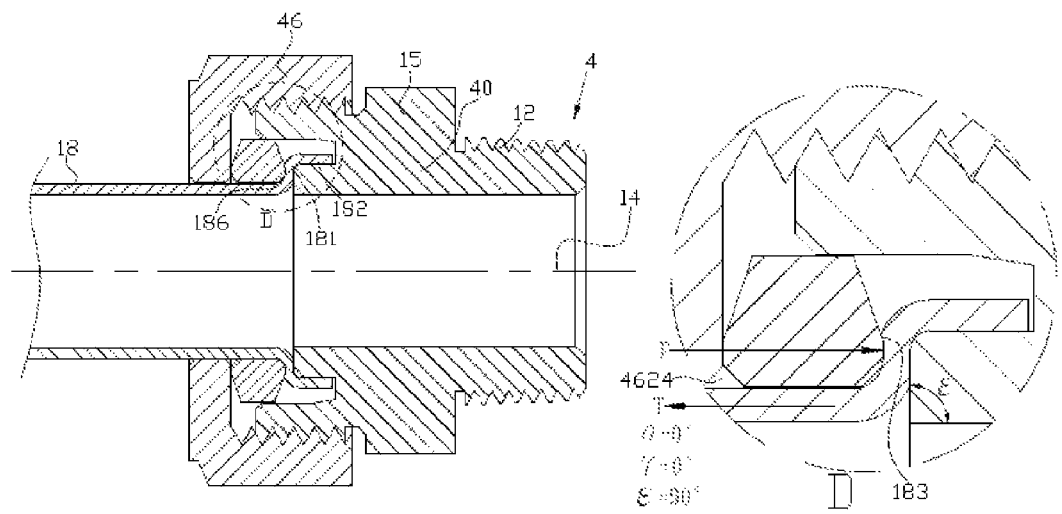

FIG. 3E: The diagram showing the 3rd embodiment example of fastening and compression of the present invention.

Figure 4A:
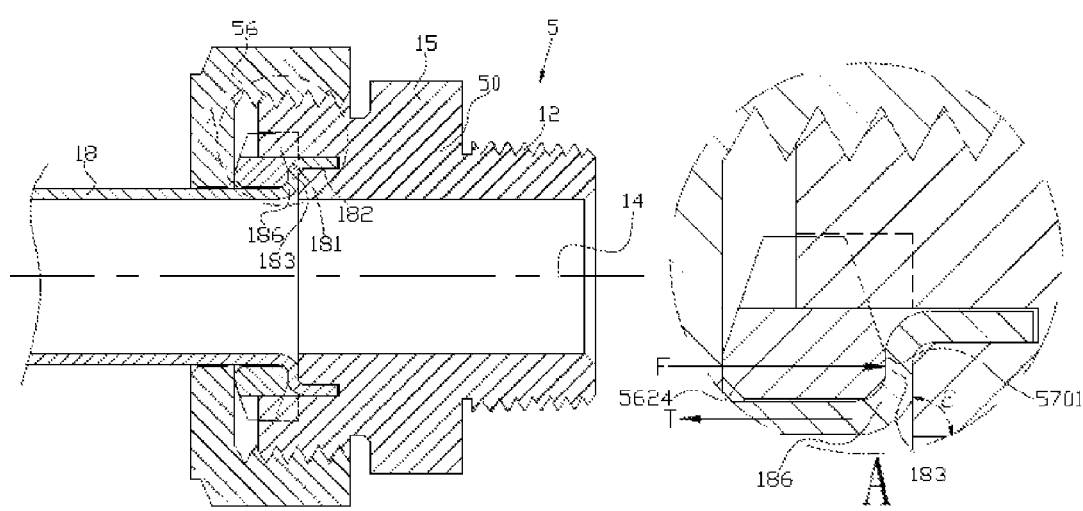

FIG. 4A: The structural cross-section view showing the 4th embodiment example of pipe joint of the present invention.

Figure 4B:
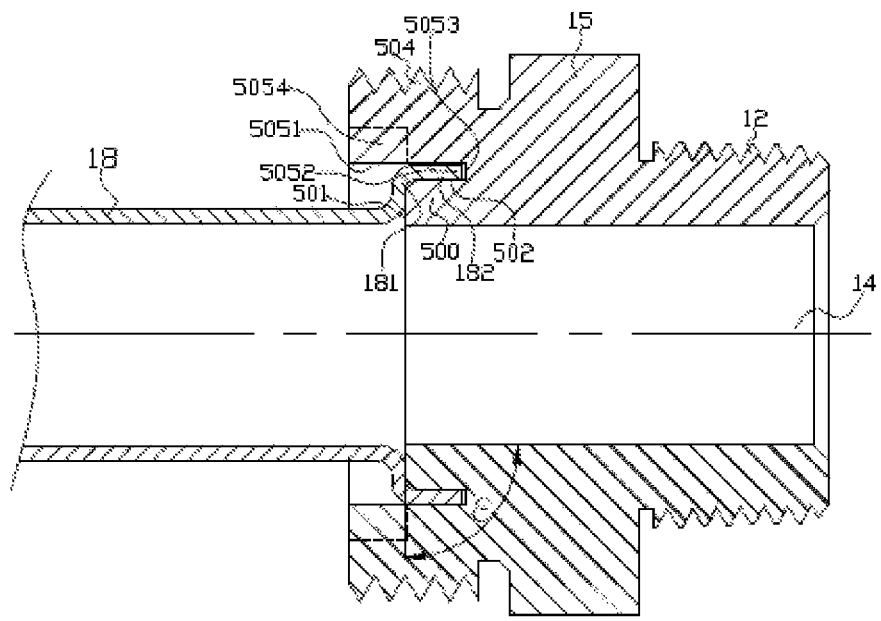

FIG. 4B: The diagram showing the 4th embodiment example of joint body of the present invention.

Figure 4C:
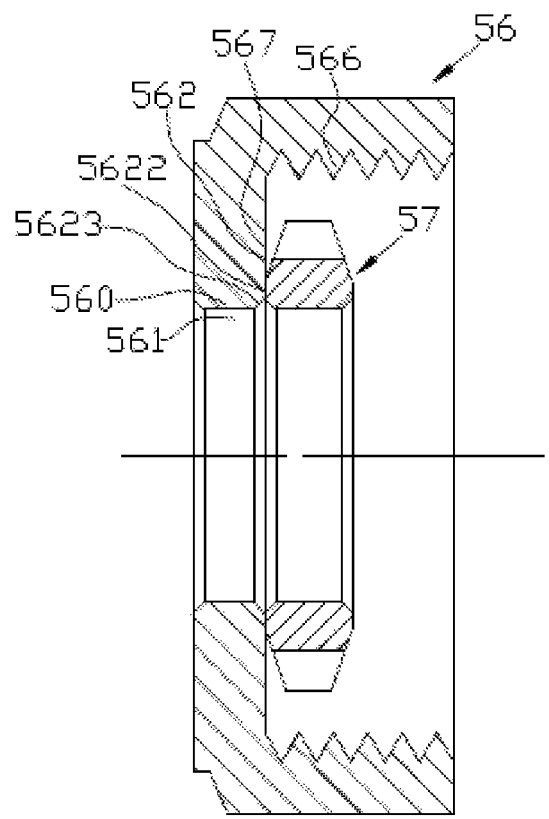

FIG. 4C: The diagram showing the 4th embodiment example of union nut of the present invention.

Figure 4D:
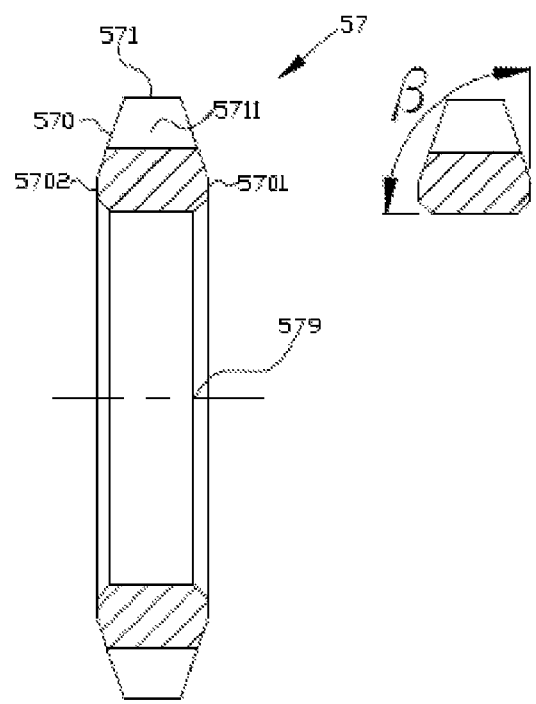

FIG. 4D: The diagram showing the 4th embodiment example of fixed ring of the present invention.

Figure 4E:
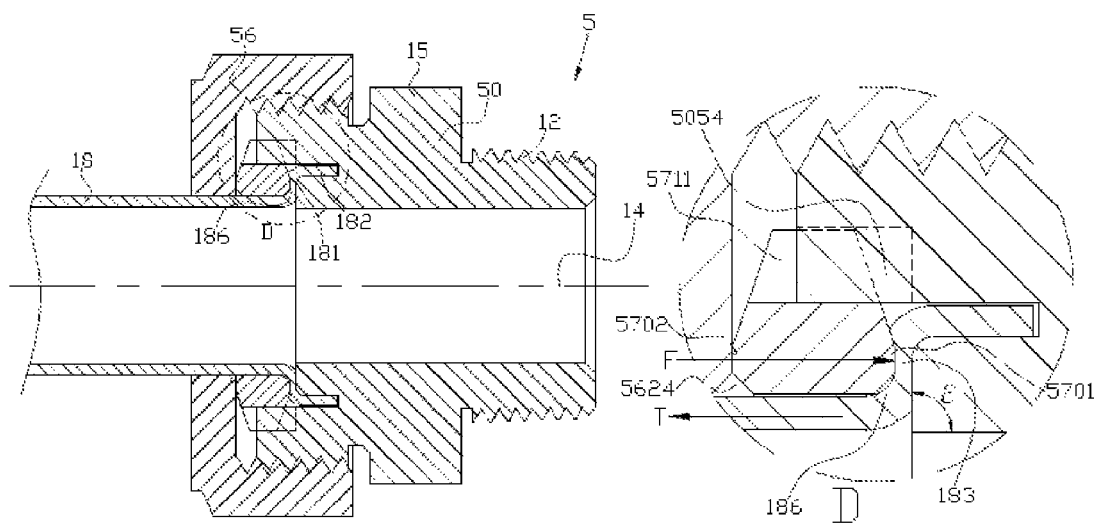

FIG. 4E: The diagram showing the 4th embodiment example of fastening and compression of the present invention.

Figure 5A:
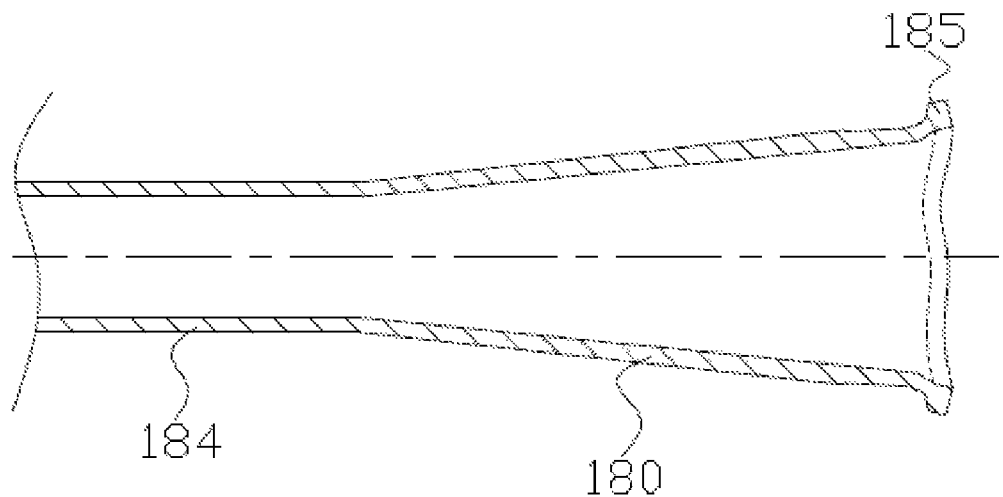

FIG. 5A: The flaring deformation of pipe joint (2) after it has been subjected to tensile test.

Figure 5B:
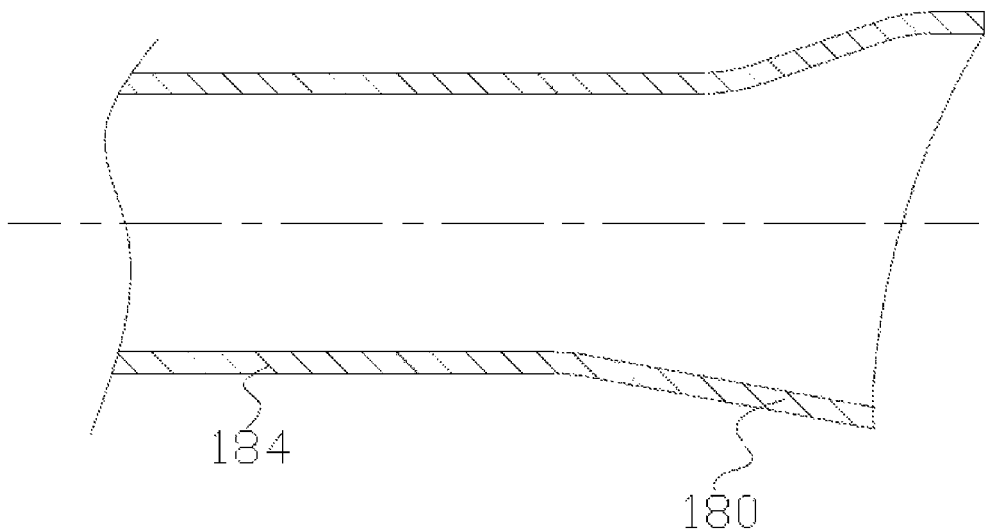

FIG. 5B: The flaring deformation of pipe joint (7) after it has been subjected to tensile test.

Figure 5C:
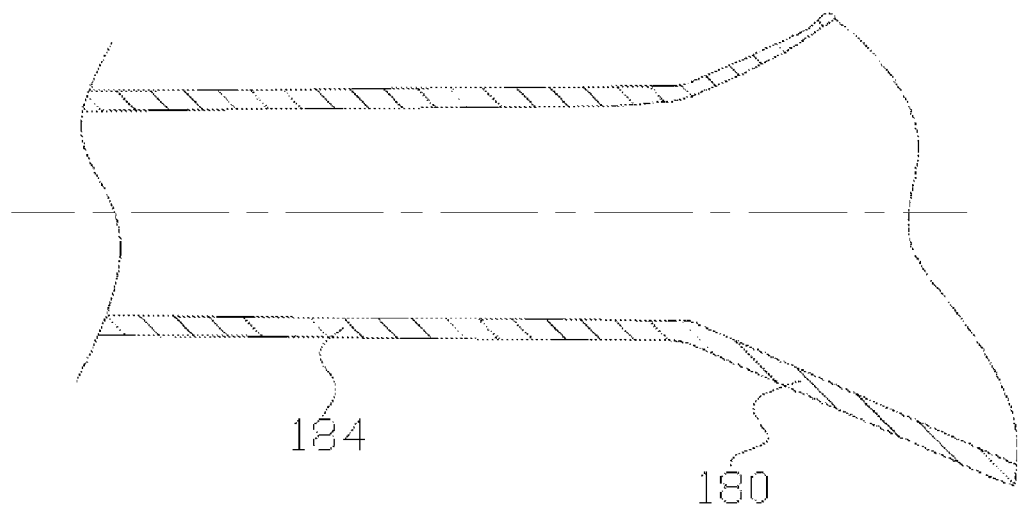

FIG. 5C: The flaring deformation of pipe joint (7A) after it has been subjected to tensile test.

Figure 5D:
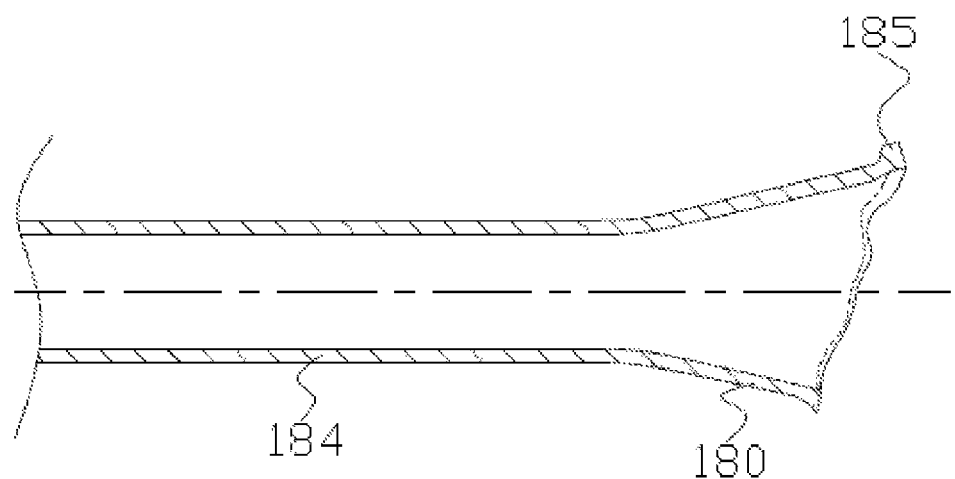

FIG. 5D: The flaring deformation of pipe joint (1) after it has been subjected to tensile test.

Figure 6A:
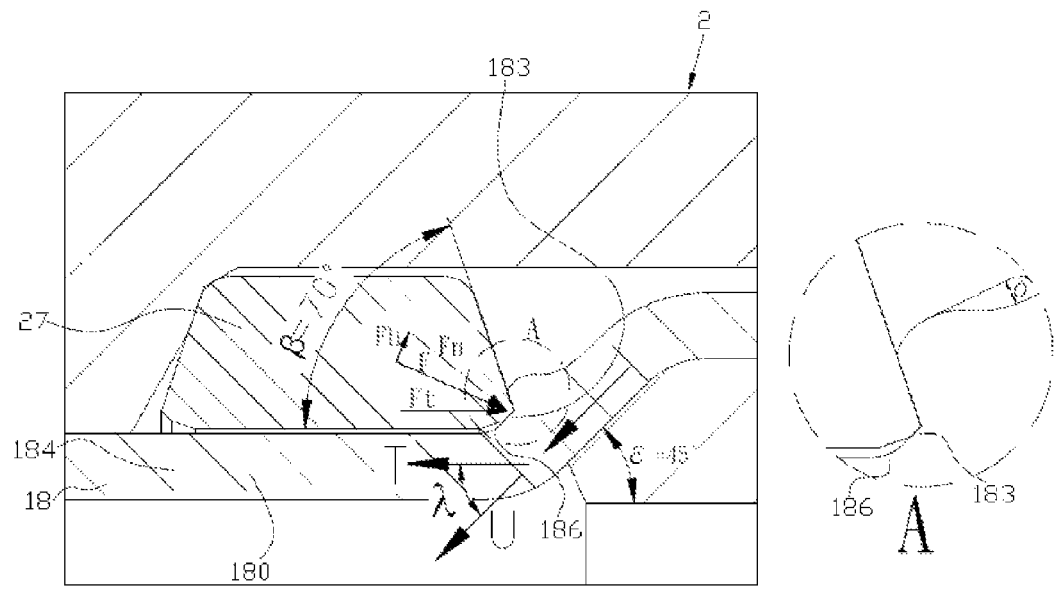

FIG. 6A: Description and comparison on U moving direction of sealed surface's wall material, based on the compression angle β=70° and conical angle ε=45°.

Figure 6B:
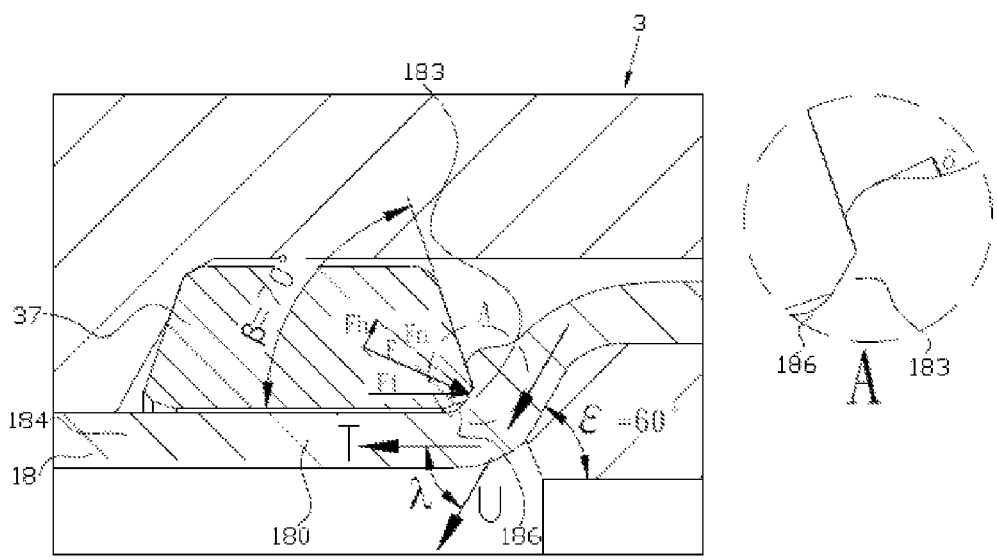

FIG. 6B: Description and comparison on U moving direction of sealed surface's wall material, based on the compression angle β=70° and conical angle ε=60°.

Figure 6C:
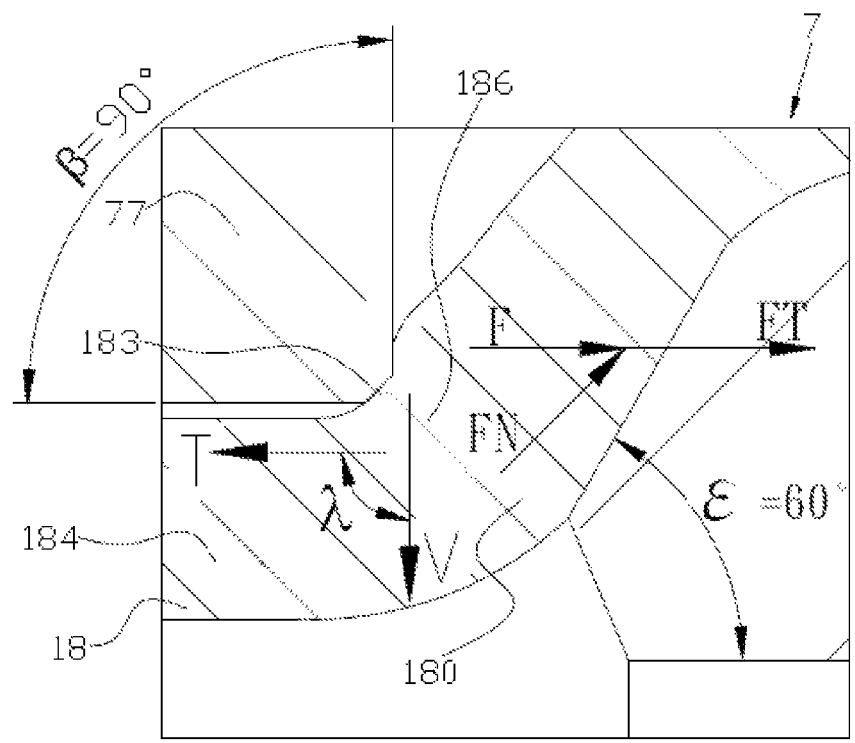

FIG. 6C: Description and comparison on V moving direction of sealed surface's wall material, based on the compression angle β=90° and conical angle ε=60°.

Figure 6D:
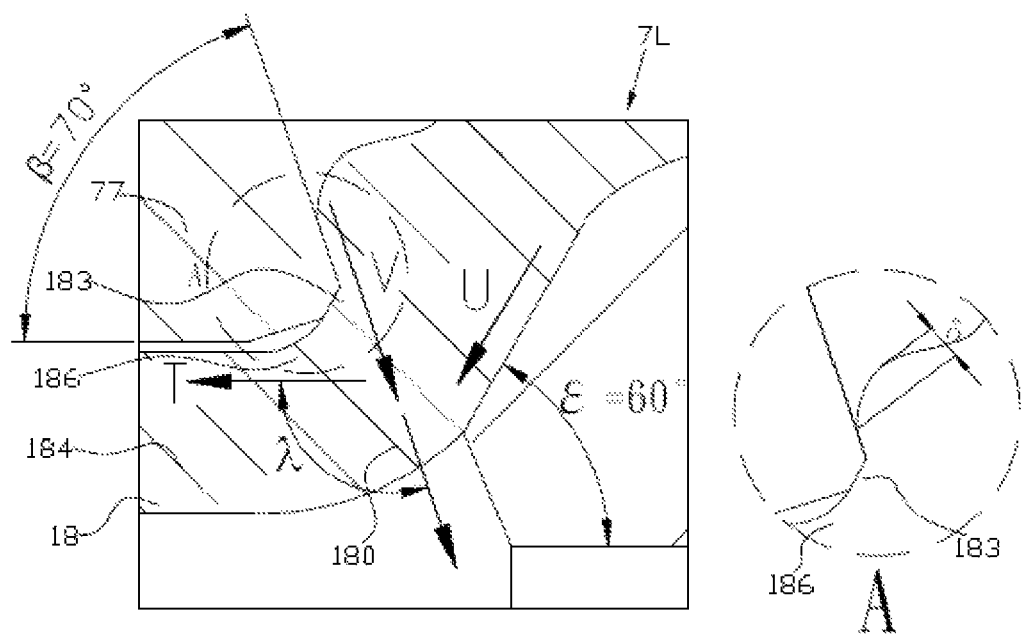

FIG. 6D: Description and comparison on V moving direction of sealed surface's wall material, based on the compression angle β=70° and conical angle ε=60°.

Figure 6E:
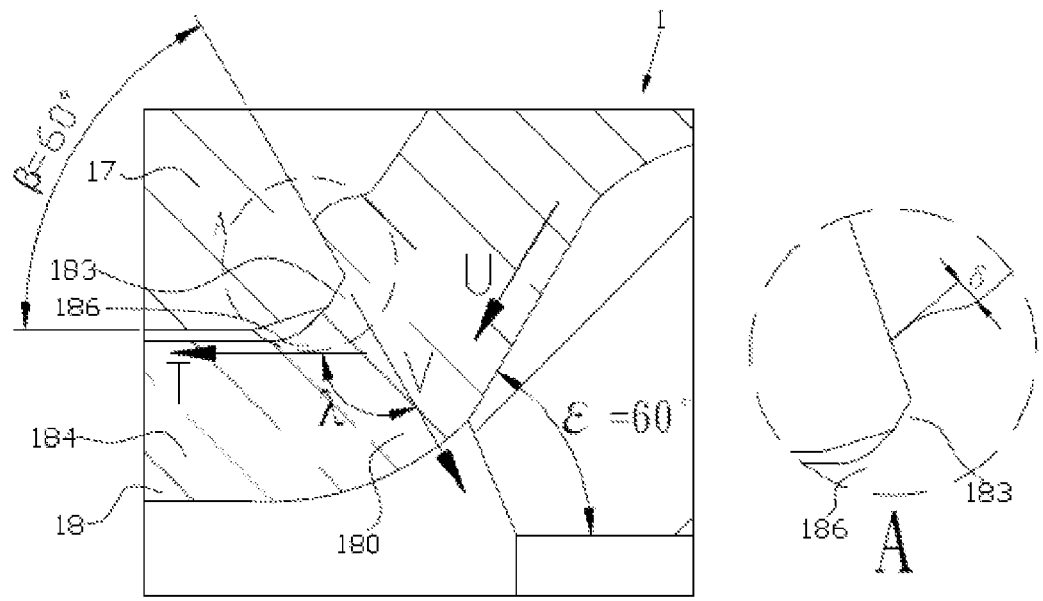

FIG. 6E: Description and comparison on V moving direction of sealed surface's wall material, based on the compression angle β=60° and conical angle ε=60°.

FIG. 7A: Diagram showing the structural cross-section view of conventional pipe joint in cited case 1.

FIG. 7B: Diagram showing the structural cross-section view of conventional pipe joint in cited case 2.

FIG. 7C: Diagram showing the conventional disc-shaped anchor plate in cited case 2.

Figure 7D:
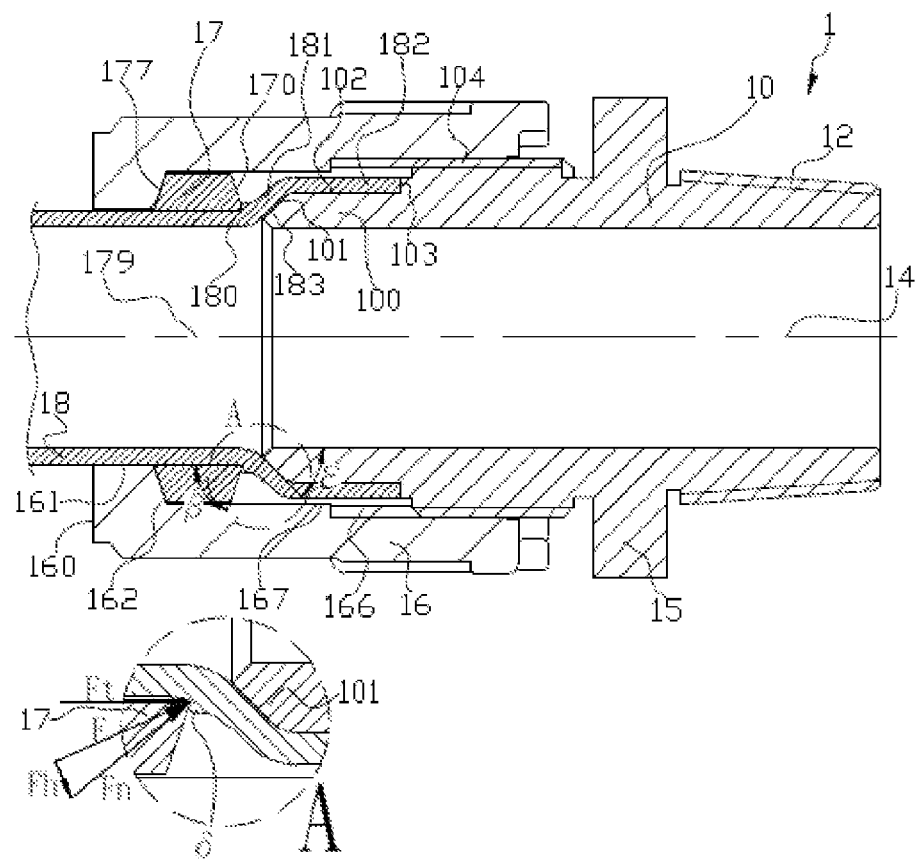

FIG. 7D: Diagram showing the structural cross-section view of conventional pipe joint in cited case 5.

Figure 7E:
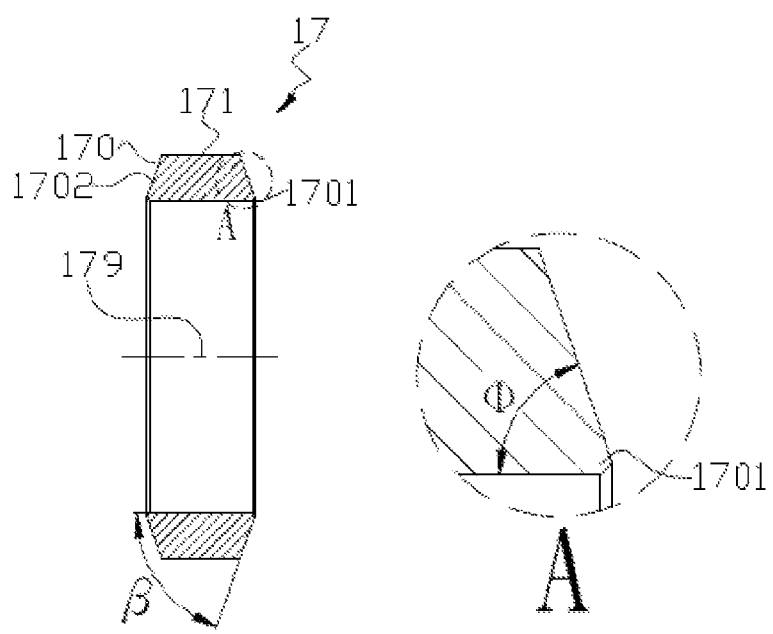

FIG. 7E: Diagram showing the cross-section view of conventional pipe joint's fixed ring in cited case 5.

FIG. 8: Diagram showing the plane exploded view of conventional pipe joint's parts in cited case 3.

FIG. 9: Diagram showing the cross-section view of pipe joint after being fastened firmly in cited case 3.

DETAILED DESCRIPTION OF THE INVENTION

The example of the 1st embodiment: As shown in FIG. 1A, FIG. 1B, FIG. 1C, FIG. 1D and FIG. 1E, the assembly drawing of first embodiment example of pipe joint (2) can be seen in FIG. 1A. The said pipe joint (2) is comprised of three parts, namely a joint body (20), a union nut (26) and a fixed ring (27), all being made of PFA material.

The end portion of PFA tube (18) is initially passed through the tapered opening (261) of union nut (26) and the central bore (279) of fixed ring (27). After being cooled or heated by a jig, the expanded hole is transformed into a flared end (180), comprising of a conical tube (181) and a cylindrical tube (182).

As shown in FIG. 1B, the joint body (20) features a central through hole (14) to direct the fluid. One end of the tube connecting portion (200) is used to connect with union nut (26) and tube (18), the other threaded end (12) to connect with other equipment or device, and the central tool engaging portion (15) to install with pipe joint (2).

According to order, the tube connecting portion (200) features a conical surface (201), a cylindrical surface (202), a trust end (203) and locking thread (204). The conical surface (201) is used to install with cone tube (181) and cylindrical tube (182) of tube (18). The conical angle ε of the conical surface (201) comes in specification of 50°≤ε≤70°. The cylindrical wall thickness is able to allow the overall axial compression of pipe joint to have a more uniform deformation, and its locking thread (204) is used to fasten with union nut (26).

As shown in FIG. 1C, the inner diameter of union nut (26) features a threaded part (266), a recess (262) and a tapered end (260). A shown in FIG. 1A, the threaded part 266) is used to fasten with the locking thread (204) of tube connecting portion (200). The center of tapered end (262) has a tapered opening (261) containing an inner recess (262) on its inner side. The said recess (262) comes with an applied force ring edge (2622) and a skew surface (2623). The outer fringe of inner recess (262) has a positioning curved surface (2621) that shrunk inward in a smooth arc manner, capable of coordinating with the stress ring edge (2702) to guide the fixed ring (27) into a center position. The skew surface (2623) has an axial gap (2624) much larger than the applied force curved surface (2622) to restrict the contact area of sliding surface, and reduce the generation of unfavorable influences caused by dimensional tolerance to lower the frictional risk of sliding.

As shown in FIG. 1D, the fixed ring (27) features a central bore (279) and an annular bulging surface (270) on both edges. It features symmetrical or asymmetrical trapezoid cross-section area, with the outer periphery (271) having a shorter axial length for placing in with an indicator paper strip on top of the indicator paper slot (2711). One end of the bulging curved surface (270) nearer to the central bore (279) is a compressing ring (2701) for pressing against the tube wall. It has a compression angle β of specification 50°≤β≤75°, with sufficient lead angle space at the fringe of central bore to prevent the compression ring (2701) from pressing on the small conical diameter (186) site of cone tube (181), as this place is prong to generate tube wall hardening phenomenon and prevent the sealed surface from achieving a good seal. On the other side is a stress ring edge (2702) for coupling with the applied force ring edge (2622) of union nut (26) to form a sealed surface. The included angle starting from the stress point of stress ring surface (2702) to the connecting line of compression ring (2701) and the center line of central bore (279) is known as the compression angle γ of compression F, with a specification of 10°≤γ≤30°

As shown in FIG. 1E, during the locking process of union nut (26), the axial direction of extended tube (18) will compress the flared end (180) to form a sealed surface (180). Coupled with its compression angle β of specification 50°≤β≤75°, it will cause the tube wall to generate a continuous cumulative deformation to strengthen the pulling resistance ability. During the locking process, the fixed ring (27) will maintain at the center position by means of a guiding mechanism, being made up of the positioning curved surface (2621) of inner periphery (262) plus the stress ring's curved surface (2702) to guide the fixed ring (27) to stay at the center position. This will allow the compression force F to distribute evenly around the circumferential direction. The applied force angle γ of compression force F of specification γ≤30° will generate an applied force angle θ of specification 5°≤θ≤15°, thereby improving the normal distribution force Fn to increase the pulling resistance distribution force Ft to achieve a sealing effect and prevent the tube from being subjected to external stretch and slip off. When the fixed ring (27) is subjected to pressure and deform, the sliding surface's contact area created by applied force ring edge (2622) and stress ring edge (2702) will enlarge following the deformation. To avoid the fixed ring (27) from rotating caused by invalid sliding resulted from enlarged stress area, the axial gap of skew surface (2623) will restrict the stress deformation into a certain range to ensure a continuous sliding motion. This is to ensure that the sealed surface (183) resulted from coupling sliding action of fixed ring (27) and union nut (26) will not generate friction. In other words, no experienced operator and careful management are needed in applying the torque to achieve a sealing effect and prevent the tube (18) from being subjected to external stretch and slip off.

The example of the 2nd embodiment: As shown in FIG. 2A, FIG. 2B, FIG. 2C, FIG. 2D and FIG. 2E, this example has a structural difference at tube connecting portion (300) of joint body (30) as compared with the 1st embodiment case. The assembly drawing of the 2nd embodiment example of pipe joint (3) can be seen in FIG. 2A. The said pipe joint (3) is comprised of three parts, namely a joint body (30), a union nut (36) and a fixed ring (37), all being made of fluorine material.

The end portion of PFA tube (18) is initially passed through the tapered opening (361) of union nut (36) and the central bore (379) of fixed ring (37). After being cooled or heated by a jig, the expanded hole is transformed into a flared end (180), comprising of a conical tube (181) and a cylindrical tube (182).

As shown in FIG. 2B, the joint body (30) features a central through hole (14) to direct the fluid. One end of the tube connecting portion (300) is used to connect with union nut (36) and tube (18), the other threaded end (12) to connect with other equipment or device, and the central tool engaging portion (15) to install with pipe joint (3).

The tube connecting portion (300) is made up of a conical surface (301), a cylindrical surface (302) and locking thread (304). It is composed of an annular slot (3052) separated by a dual-concentric structure of outer periphery and inner periphery. The surface of outer periphery comes with locking thread (304), and the surface of inner periphery contains a conical surface (301) and cylindrical surface (302). The annular slot (3052) lies between the cylindrical surface (302) and guiding inner diameter (3051), the base of which has a trust end (3053). The space of this annular slot (3052) is big enough to accommodate the cylindrical tube (181). The conical surface (301) and the cylindrical surface (302) are used to install with cone tube (181) of tube (18) and the cylindrical tube (182). When the cone tube (181) is subjected to compression, its inner wall will abut the conical surface (301). The conical angle ε of conical surface (301) of specification 50°≤ε≤75° and the wall thickness of cylindrical surface (302) will allow the overall axial compression of pipe joint to generate a more uniform deformation, and the locking thread (304) is used to fasten with union nut (36).

As shown in FIG. 2C, the inner diameter of union nut (36) has a threaded part (366), an inner recess (362) and a tapered end (360). The threaded part (366) is used to fasten with the locking thread (304) of tube connecting portion (300). The center of tapered end (360) has a tapered opening (361) that comprises of an inner recess (362) at the inner side. The said inner recess contains an applied force ring edge (3622) and a skew surface (3623). The applied force ring edge (3622) is able to couple with the stress ring curved edge (3702) to form a sliding surface to transmit the compression force F to fixed ring (37). The skew surface (3623) has a much larger axial gap (3624) than the applied force ring edge (3622) to restrict the sliding surface's contact area within a certain range, thereby reducing unfavorable influences caused by dimensional tolerance to lower the frictional risk of sliding.

As shown in FIG. 2D, the fixed ring (37) features a central bore (379) and an annular bulging surface (370) on both edges. Its cross-section area shows a symmetrical or asymmetrical trapezoid structure, with the outer periphery (371) having a shorter axial length. This outer periphery (371) is able to coordinate with the guiding inner diameter (3051) of tube connecting portion (300) to guide the fixed ring (37) to stay at the center position. There is a compression ring (3701) with a compression angle β of specification 55°≤β≤75° near the central bore (379) on one side of the bulging surface (370) that used to abut the tube wall of cone tube (181). The lead angle at the fringe of central bore has sufficient space to prevent the compression ring (3701) from compressing the small conical diameter (186) site of cone tube (181), as this place is prong to generate tube wall hardening phenomenon and prevent the sealed surface from achieving a good seal. There is a stress ring edge (3702) on the other side for coupling with the applied force ring edge (3622) of union nut (36) to form a sliding surface. The included angle starting from the stress point of stress ring surface (3702) to the connecting line of compression ring (3701) and the center line of central bore (379) is known as the compression angle γ of compression F, with a specification of γ≤30°.

As shown in FIG. 2E, during the locking process of union nut (36), the axial of extended tube (181) will compress the flared end (180) of cone tube (181) to form a sealed surface. Coupled with its compression angle β of specification 50°≤β≤75°, it will cause the tube wall to generate a continuous cumulative deformation to strengthen the pulling resistance ability. During the locking process, the fixed ring (37) will maintain at the center position by means of a guiding mechanism, being made up of the guiding inner diameter (3051) of tube connecting portion (300) and the outer periphery (371) of fixed ring (37) to guide the fixed ring (37) to stay at the center position. This will allow the pressing force F to distribute evenly around the circumferential direction. The applied force angle γ of compression force F of specification 10°≤γ≤30° and applied force included angle ↓ of specification 5°≤θβ15° will improve the normal distribution force Fn and increase the pulling resistance distribution force Ft to achieve the sealing effect and prevent the tube from being subjected to external stretch and slip off. When the fixed ring (37) is subjected to pressure and deform, the sliding surface's contact area created by applied force ring edge (3622) and the stress ring edge (3702) will enlarge following the deformation. To avoid the fixed ring

(37) from rotating caused by invalid sliding resulting from enlarged stress area, the axial gap of skew surface (3623) is able to restrict the stress deformation into a certain range to ensure a continuous sliding motion. This is to ensure that the sealed surface (183) resulted from coupling sliding of fixed ring (37) and union nut (36) will not generate friction. In other words, no experienced operator and careful management are needed in applying the torque to achieve a sealing effect and prevent the tube (18) from being subjected to external stretch and slip off.

The example of the 3rd embodiment: As shown in FIG. 3A, FIG. 3B, FIG. 3C, FIG. 3D and FIG. 3E, this example has a structural difference in the tube connecting portion (400) of joint body (40) as compared with the 2nd embodiment case. The assembly drawing of the 3rd embodiment example of pipe joint (4) can be seen in FIG. 3A. The said pipe joint (4) is comprised of three parts, namely a joint body (40), a union nut (46) and a fixed ring (47), all being made of fluorine material.

As shown in FIG. 3B, the tube connecting portion (400) is made up of a conical surface (401), a cylindrical surface (402) and locking thread (404). It is composed of an annular slot (4052) separated by a dual-concentric structure of outer periphery and inner periphery. The conical surface (401) of tube connecting portion (400) is vertical with a conical angle $\epsilon$ of specification $\epsilon=90°$. When the cone tube (181) is subjected to compression, the point where the wall is pressed by the compression ring (4701) will response with more deformation, allowing the inner wall of sealed surface to abut on the conical surface (401). Meanwhile, the wall thickness of cylindrical wall (402) is able to allow the overall axial compression on pipe joint to have a more uniform deformation.

As shown in FIG. 3C, the inner diameter of union nut (46) has a threaded part (466), an inner recess (462) and a tapered end (460). The inner side of tapered end (460) is an inner recess (462) containing an applied force ring edge (4622) located near the central bore and a skew surface (4623). The applied force ring edge (4622) is able to couple with the stress ring edge (4702) to form a coupling sliding surface to transmit the compression force F to fixed ring (47). The skew surface (4623) has a much larger axial gap (4624) than the applied force edge (4622) to restrict this contact area of coupling sliding surface within a certain range, thereby reducing the unfavorable influences and lower the frictional risk of sliding at the sealed surface.

As shown in FIG. 3D, the fixed ring (47) features a central bore (479) and at least an annular bulging surface (470) at one edge. Its cross-section area shows a symmetrical or asymmetrical trapezoid structure, with the outer periphery (471) having a shorter axial length being able to coordinate with the guiding inner diameter (4051) of tube connecting portion (400) to guide the fixed ring (47) to stay at the center position. There is a compression ring (4701) with a compression angle $\beta$ of specification $55°\leq\beta\leq75°$ near the central bore (479) on one side of the bulging surface (470) to abut the tube wall of cone tube (181). The lead angle at the fringe of central bore has sufficient space to prevent the compression ring (4701) from pressing on the small conical diameter (186) site of cone tube (181), as this place is prong to generate tube wall hardening phenomenon and prevent the sealed surface from achieving a good seal. The force stress ring edge (4702) on the other side is used to couple with the applied force ring edge (4622) of union nut (46) to form a sliding surface. The included angle starting from the stress point of stress ring surface (4702) to the connecting line of compression ring (4701) and the center line of central bore (479) is known as the compression angle $\gamma$ of compression F, with a specification of $\gamma\leq10°$.

As shown in FIG. 3E, during the locking process of union nut (46), the axial of extended tube (18) will compress the tapered end (180) of cone tube (181), forcing the cone tube (181) to make local deformation. There is also an annular surface to abut the conical surface (401) with an angle $\gamma=90°$. Coupled with its compression angle $\beta$ of specification $50°\leq\beta\leq75°$, the annular sealed surface (183) will cause the tube wall to generate a continuous cumulative deformation to strengthen the pulling resistance ability. During the locking process, the fixed ring (47) will maintain at the center position by means of a guiding mechanism, being made up of the guiding inner diameter (4051) of tube connecting portion (400) and the outer periphery (471) of fixed ring (47) to guide the fixed ring (47) to stay at the center position. This will allow the compression force F to distribute evenly around the circumferential direction. The applied force angle $\gamma$ of compression force F of specification $0°\leq\gamma\leq10°$ and the applied force included angle $\theta$ of specification $0°\leq\theta\leq15°$ will improve the normal distribution force Fn and increase the pulling resistance distribution force Ft to achieve a sealing effect and prevent the tube from being subjected to external stretch and slip off. When the fixed ring (47) is subjected to pressure and deform, the sliding surface's contact area created by applied force ring edge (4622) and the stress ring edge (4702) will enlarge following the deformation. To avoid the fixed ring (47) from rotating caused by invalid sliding resulting from enlarged stress area, the axial gap of skew surface (4623) is able to restrict the stress deformation into a certain range to ensure a continuous sliding motion. This is to guarantee that the sealed surface (183) resulted from coupling sliding of fixed ring (47) and union nut (46) will not generate friction. In other words, no experienced operator and careful management are needed in applying the torque to achieve a sealing effect and prevent the tube (18) from being subjected to external stretch and slip off.

The example of the 4th embodiment: As shown in FIG. 4A, FIG. 4B, FIG. 4C, FIG. 4D and FIG. 4E, it is difference from the 3rd cited case for being able to ensure that the fixed ring (57) will not move completely. The assembly drawing of the 4th embodiment example of innovative pipe joint (5) can be seen in FIG. 4A. The said pipe joint (5) is comprised of three parts, namely a joint body (50), a union nut (56) and a fixed ring (57), all being made of fluorine material.

As shown in FIG. 4B, the tube connecting portion (500) is made up of a conical surface (501), a cylindrical surface (502) and locking thread (504). It is composed of an annular slot (5052) separated by a dual-concentric structure of outer periphery and inner periphery. The conical surface (501) of the tube connecting portion (500) is vertical with a conical angle $\epsilon$ of specification $\epsilon=90°$. When the cone tube (181) is subjected to compression, the point where the wall is compressed by the compression ring (5701) will response with more deformation, allowing the inner wall of sealed surface to abut on the conical surface (501). Meanwhile, the wall thickness of cylindrical surface (502) is able to allow the overall axial compression on pipe joint to have a more uniform deformation.

As shown in FIG. 4C, the inner diameter of union nut (56) has a threaded part (566), an inner recess (562) and a tapered end (560). The inner side of tapered end (560) is an inner recess (562) containing an applied force ring edge (5622) located near the central bore. The applied force ring edge (5622) is able to couple with the stress ring edge (5702) to form a coupling sliding surface to transmit the compression force F to fixed ring (57).

As shown in FIG. 4D, the fixed ring (57) features a central bore (579) and at least an annular bulging surface (570) at one edge. Its cross-section area shows a symmetrical or asymmetrical trapezoid structure, with the outer periphery (571) having a shorter axial length being able to coordinate with the guiding inner diameter (5051) of tube connecting portion (500) to guide the fixed ring (57) to stay at the center position. This outer periphery (571) has a plurality of axial slots (5711) to coordinate with the plurality of bulging ribs (5052) found at the guiding inner diameter (5051) of tube connecting portion (500), preventing the fixed ring (57) from rotating and completely eliminating the sliding friction on the sealed surface (183). The bulging surface (570) at the other end near the central bore (579) is a compression ring (5701) with a compression angle β of specification $55°≤β≤75°$ for compressing the tube wall of cone tube (181). The lead angle at the fringe of central bore has sufficient space to prevent the compression ring (5701) from compressing the small conical diameter (186) site of cone tube (181), as this place is prong to generate tube wall hardening phenomenon and prevent the sealed surface from achieving a good seal. The stress ring edge (5702) on the other side will couple with the applied force ring edge (5622) of union nut (56) to form a sliding surface. The included angle starting from the stress point of stress ring surface (4702) to the connecting line of compression ring (4701) and the center line of central bore (479) is known as the compression angle γ of compression F, with a specification of $γ≤10°$.

As shown in FIG. 4E, during the locking process of union nut (56), the axial extended tube (18) will compress the tapered end (180) of cone tube (181) to form a sealed surface (183). Coupled with its compression angle β of specification $50°≤β≤75°$, it will cause the tube wall to generate a continuous cumulative deformation to strengthen the pulling resistance ability. During the locking process, the fixed ring (57) will maintain at the center position by means of a guiding mechanism, being made up of the guiding inner diameter (5051) of tube connecting portion (500) and the outer periphery (571) of fixed ring (57) to guide the fixed ring (57) to stay at the center position. This will allow the compression force F to distribute evenly around the circumferential direction. The applied force angle γ of compression force F of specification $0°≤γ≤10°$ and the applied force included angle θ of specification $0°≤θ≤15°$ will improve the normal distribution force Fn and increase the pulling resistance distribution force Ft to achieve a sealing effect and prevent the tube from being subjected to external stretch and slip off. The axial slot (5711) at the outer periphery of (571) of fixed ring (57) will coordinate with the bulging rib (5054) of guiding inner diameter (5051) to allow only an axial motion of extended tube (18) and not a rotational movement. This will completely eliminate sliding friction of the sealed surface (183) to achieve a sealing effect and prevent the tube (18) from being subjected to external stretch and slip off.

Please refer to Table 1. The respective pipe joint (2), pipe joint (3), pipe joint (7), pipe joint (7A) and pipe joint (1) have one end of their tube (18) being welded and sealed, and fastened firmly. After undergoing a 150° C. high-temperature baking procedure, they are conducted with a hydrostatic pressure resistance test to obtain the maximum pressure resistance values. Only pipe joint (2) and pipe joint (3) were found to withstand the non-leakage requirement of 7 bar pressure, i.e. when the distribution compression force Fn of the sealed surface being able to distribute evenly. Both pipe joint (2) and pipe joint (3) were found to have a uniform compression deformation when fastened to various parts. These compression deformations within the elasticity range will lose part of their elasticity and lower their compression forces when subjected to 150° C. high-temperature heating, but they are still able to maintain a uniform compression deformation on the sealed surface with a better compression force.

TABLE 1

Hydrostatic Pressure Test Values of 1" Tubes After Being Baked

| Specification | Pipe joint (2) and (3) in the present invention | Pipe joint (7) in the cited case 1 | Pipe joint (7A) in the cited case 2 | Pipe joint (1) in the cited case 5 |
|---|---|---|---|---|
| Pressure kg/cm² | 9 | 1 | 1.5 | 3 |

Please refer to Table 2. The 1" PFA tubes has a basic wall thickness of 1.6 mm thick, and their flared ends (180) of tubes (18) are fastened firmly with four different pipe joints. The center portion of straight tube portion (184) is subjected to stretch. The said pulling strength value is based on the condition where one end of the tube (18) has been stretched, and that elongation rate referred to the comparison value of final plastic deformation length over the original length of the straight tube portion (184) where the tube (18) has been stretched. The test results indicate that the pulling resistance ability of the innovative pipe joint is found to be outstanding, with an elongation rate of exceeding two times its original length.

TABLE 2

Tensile Test Values of 1" Pipe Joints

| Specification | Pipe joint (2) and (3) in the present invention | Pipe joint (7) in the cited case 1 | Pipe joint (7A) in the cited case 2 | Pipe joint (1) in the cited case 5 |
|---|---|---|---|---|
| Tensile Strength Value(Kg) | >180 kg | >110 kg | >110 kg | >160 kg |
| Elongation (100%) | >2 | >1.1 | >1.2 | >1.6 |

Please refer to FIG. 5A, FIG. 5B, FIG. 5C and FIG. 5D which shows the flared end (180) of tube (18) and the deformed condition of straight tube portion (184) after they have been conducted with tensile test. Among them, FIG. 5A is pipe joint (2), FIG. 5B is pipe joint (7), FIG. 5C is pipe joint (7A) and FIG. 5E is pipe joint (1). After tube (18) has been stretched, the tube wall's material moving manner of sealed surface (183) is related to whether or not the compression distribution force Fn of sealed surface is able to distribute evenly.

The straight tube (184) portions of pipe joint (2) and pipe joint (3) have been stretched twice longer than their original lengths, and their flared ends (180) have been stretched to become a regular conical shape where their opening end portions have formed a thicker round ring (185) in near annular design, indicating that their sealing abilities are the best.

The straight tube (184) of pipe joint (7) has been stretched twice longer than its original length, and the flared end (180) been stretched to become an irregular conical shape but no annular ring has been formed on the opening portion, indicating that it has a poor sealing ability.

The straight tube portion (184) of pipe joint (7A) has been stretched twice longer than its original length, and the flared end (180) been stretched to become an irregular conical shape where almost no annular ring has been formed on the opening portion. This indicates that it has a poor sealing ability and the disc-shaped anchor plate (77) has helped to improve the sealing ability but it has yet to meet with requirements.

The straight tube portion (184) of pipe joint (7A) has been stretched less than two times its original length, and the flared end (180) been stretched to become an irregular conical shape. Its opening end has shown a fixed ring (185) to indicate it has a poor sealing ability. The fixed ring (17) has significantly helped to improve the sealing ability but it has yet to meet with requirements.

From the above tests on stretch deformation of flared end (180), we are able to understand the sealed surface (183) further, whether or not the compression distribution force Fn is able to distribute evenly. For example, pipe joint (2) has shown a regular conical shape to denote a uniform distribution, whereas, the remaining cases have shown uneven distribution.

More detailed descriptions on the formation and appearance of annular ring (185) are shown in FIG. 6A, FIG. 6B, FIG. 6C, FIG. 6D and FIG. 6D. Under the circumstances that the compression distribution force Fn of sealed surface (183) is adequate, and when the tube wall of sealed surface is subjected to stretching force T, the cone tube's wall material moving direction U and the applied force ring's wall material moving direction V are related to the included angle $\lambda$ of pulling force T. This represents that it is the course where the sealed surface's wall material must change when subjected to stress deformation and moves, and that the material moving directions on the tube walls of both sealed surfaces are different.

When the conical angle $\epsilon$ of conical surface is 45°, the material moving included angle of conical surface's tube wall moving direction U is 45°, wherein the material movement has to change and make a 45° turn. When the conical angle is 60°, the material moving included angle has increased to 60°, making it hard to move as the material movement has to change and make a 60° turn. When the compression angle $\beta$ is 90°, the material moving included angle $\lambda$ of compression ring's tube wall material moving direction V is 90°; when the compression angle $\lambda$ is 70°, the material moving included angle has to increase to 110°, obviously making it hard to move as the material movement has to change and bypass 110°. When the compression angle $\beta$ is 60°, the material moving included angle $\lambda$ has to increase to 120°, obviously making it more difficult to move as the tube wall material movement has to bypass the compression angle by 120°.

From the sizes of material moving included angles mentioned above, we are able to understand the relative movements of tube wall materials on the conical surface, indicating that an adequate compression distribution force Fn is needed to apply on the sealed surface (183) before it is able to reduce the excessive material movement and lower the pulling resistance ability, and the wall material on the compression angle $\beta$ will relatively hard to move. Hence, the smaller the compression angle $\beta$, the harder is the movement of wall material. When there is enough compression distribution force Fn, there is more wall material on compression angle $\beta$ to generate a continuous annular deformation to accumulate wall thickness $\delta$ when it is subjected to pulling force. The accumulated material thickness $\delta$ is generated from plastic deformation, which will relatively move towards the tube opening end continuously to form a thicker annular ring (185). When the compression angle $\beta$ is 90°, the material moving included angle $\lambda$ of compression surface's tube wall moving direction V is 90°. At this point, the tube wall material movement is relatively simple as it only needs to bypass the compression angle by 90° and not easy to generate a continuous annular deformation and an accumulated wall thickness $\delta$. In other words, it is unlikely to form an annular ring (185) around the opening and cannot achieve a high pulling resistance ability. As shown in FIG. 6D and FIG. 6D of respective compression angles $\beta$ of 70° and 90°, when the compression angle $\beta$ is smaller than 90°, the material moving included angle $\lambda$ of compression ring's tube wall moving direction V will be greater than 90°. At this point, the tube wall material movement will need to bypass the compression angle greater than 90°. Furthermore, the smaller the compression angle $\beta$, the greater is the material moving included angle $\lambda$ and the harder it is for the material to move. This will easily generate a continuous annular deformation and cumulative wall thickness $\delta$, and easier to form an annular ring (185) around the opening to achieve a high pulling resistance ability.

EFFECTS OF THE INVENTION

The result findings of pipe joint (2), pipe joint (3) and pipe joint (4) in these examples indicate that they have a high sealing ability, as fixed ring (27), fixed ring (37) and fixed ring (47) are truly able to secure on the center position, allowing the compression force distribution force Fn of sealing surface (183) to distribute evenly to maintain the compression angle as close as 10° and increase the Fn distribution force. After undergoing a tensile test on these embodiment examples, they have been found to generate an annular cumulative deformation of tube wall material to increase the pulling force ability. Pipe joint (5) can even immobilize the fixed ring (57) completely and eliminate the frictional risk of sliding on the sealed surface.

What we claimed is:
1. A pipe joint structure comprising:
a main tube;
the main tube being made of fluororesin materials;
a pipe joint;
the pipe joint being made of fluororesin materials;
the pipe joint being fasten to an end of the main tube;
the pipe joint comprising a joint body, a union nut and a fixed ring;
the union nut comprising a tapered opening;
the fixed ring comprising a central bore;
the end of the main tube passing through the tapered opening of the union nut and the central bore of the fixed ring;
the end of the main tube being expanded to form a flared end;
the main tube comprising a cone tube and a cylindrical tube;
the cone tube and the cylindrical tube being formed at the flared end;
the joint body comprising a center through hole;
the center through hole being configured to direct a fluid;
the joint body further comprising a tube connecting portion at an end thereof;
the tube connecting portion being engaged with the union nut and abutting against the main tube;

the tube connecting portion comprising a conical surface, a cylindrical surface and a locking thread;
the conical surface and the cylindrical surface of the tube connecting portion abutting against the cone tube and the cylindrical tube of the main tube;
the conical surface comprising a conical angle $\epsilon$,
the conical angle $\epsilon$ being 50° to 75°;
the locking thread being engaged with the union nut;
the union nut further comprising an inner side, a threaded part, a recess and a tapered end;
the threaded part, the recess and the tapered end being formed on the inner side;
the threaded part of the union nut being engaged with the locking thread of the tube connecting portion;
the center of said tapered end has a tapered opening containing an inner curved surface at its inner side;
the recess comprising an applied force ring edge;
the fixed ring further comprising a stress ring edge;
the applied force ring edge of the recess abutting against the stress ring edge of the fixed ring;
the fixed ring further comprising two bulging curved surfaces;
the two bulging curved surfaces being formed near the central bore;
the fixed ring further comprising a compression ring edge;
the stress ring edge being formed on one of the two bulging curved surfaces;
the compression ring edge being formed on the other one of the two bulging curved surfaces;
the fixed ring further comprising a symmetrical or asymmetrical near-trapezoid cross-section;
the compressing ring edge abutting against the cone tube, opposite to the conical surface;
the bulging curved surface comprising a compressions angle $\beta$;
the compressions angle $\beta$ being 55° to 75°;
a compression force;
the compression force being transmitted to the compression ring edge;
an applied force included angle $\theta$;
the applied force included angle $\theta$ being formed in between the compression force and a normal line of the conical surface; and
the applied force included angle $\theta$ being 0° to 15°.

2. The pipe joint structure as claimed in claim 1 further comprising:
an outer periphery of fixed ring being installed with a color-changing indicator paper strip capable of reacting with leaked fluid.

3. The pipe joint structure as claimed in claim 1 further comprising:
the cone tube comprising a conical spot; and
the compressing ring edge being prevented from abutting against the conical spot.

* * * * *